US011651673B2

(12) United States Patent
Kim et al.

(10) Patent No.: US 11,651,673 B2
(45) Date of Patent: May 16, 2023

(54) ELECTRONIC DEVICE FOR SUPPORTING TASK MANAGEMENT SERVICE AND OPERATING METHOD THEREOF

(71) Applicant: Samsung Electronics Co., Ltd., Gyeonggi-do (KR)

(72) Inventors: Soojung Kim, Gyeonggi-do (KR); Hyunjin Kim, Gyeonggi-do (KR); Sangchul Yi, Gyeonggi-do (KR); Seolynn Park, Gyeonggi-do (KR); Hyori Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 230 days.

(21) Appl. No.: 17/109,630

(22) Filed: Dec. 2, 2020

(65) Prior Publication Data

US 2021/0241600 A1    Aug. 5, 2021

(30) Foreign Application Priority Data

Jan. 30, 2020   (KR) .................... 10-2020-0011407

(51) Int. Cl.
*G06Q 10/00*     (2023.01)
*G08B 21/24*     (2006.01)
*G06Q 10/109*    (2023.01)
*G06Q 10/1093*   (2023.01)
*G06Q 10/06*     (2023.01)
(Continued)

(52) U.S. Cl.
CPC ........... *G08B 21/24* (2013.01); *G06F 3/0482* (2013.01); *G06Q 10/06* (2013.01); *G06Q 10/06316* (2013.01); *G06Q 10/109* (2013.01); *G06Q 10/1097* (2013.01); *H04L 51/224* (2022.05)

(58) Field of Classification Search
None
See application file for complete search history.

(56) References Cited

U.S. PATENT DOCUMENTS 10,255,566 B2    4/2019   Gruber et al.
2004/0230685 A1  11/2004  Seligmann
(Continued)

FOREIGN PATENT DOCUMENTS

KR    1020040067948    7/2004
KR    10-0755710       9/2007
(Continued)

OTHER PUBLICATIONS

User Notification Interface Using Internet of Things Devices, Sep. 10, 2018, ip.com (Year: 2018).*

(Continued)

*Primary Examiner* — Naresh Vig
(74) *Attorney, Agent, or Firm* — The Farrell Law Firm, P.C.

(57) ABSTRACT

Disclosed is an electronic device including an intelligence function that reminds a user of a task to be performed, even though the user does not manually set a reminder and notifies the user whether the task has been completed. This intelligence function may be implemented in various applications, such as a reminder, a calendar, or an artificial intelligence assistant. Aspects of the disclosure may also increase business utilization of a care service. For example, the electronic device may be used to check the progress of housework of a sitter who cares for a person such as a child, an elderly parent, or a patient.

14 Claims, 19 Drawing Sheets

(51) Int. Cl.
    *G06Q 10/0631*      (2023.01)
    *G06F 3/0482*      (2013.01)
    *H04L 51/224*      (2022.01)

(56) References Cited

U.S. PATENT DOCUMENTS

| | | |
|---|---|---|
| 2007/0271567 A1 | 11/2007 | Cho |
| 2010/0332280 A1* | 12/2010 | Bradley .......... G06Q 10/06316 |
| | | 705/7.26 |
| 2012/0309363 A1* | 12/2012 | Gruber ................. G06Q 10/109 |
| | | 455/414.1 |
| 2014/0070945 A1* | 3/2014 | Dave .................. G06Q 10/1095 |
| | | 340/540 |
| 2014/0343950 A1 | 11/2014 | Simpson et al. |
| 2015/0015409 A1 | 1/2015 | Won |
| 2016/0248865 A1* | 8/2016 | Dotan-Cohen ......... H04L 67/55 |
| 2017/0200132 A1 | 7/2017 | Jordan et al. |
| 2018/0181922 A1* | 6/2018 | Choi .................... G06F 11/3438 |
| 2018/0205770 A1 | 7/2018 | Joo et al. |
| 2018/0341891 A1* | 11/2018 | Setchell ................. G06Q 10/10 |
| 2018/0373399 A1 | 12/2018 | Battula et al. |
| 2019/0095846 A1* | 3/2019 | Gupta ............ G06Q 10/063114 |

FOREIGN PATENT DOCUMENTS

| | | |
|---|---|---|
| KR | 1020160129721 | 11/2016 |
| KR | 1020180085355 | 7/2018 |

OTHER PUBLICATIONS

International Search Report dated Feb. 19, 2021 issued in counterpart application No. PCT/KR2020/016281, 3 pages.

* cited by examiner

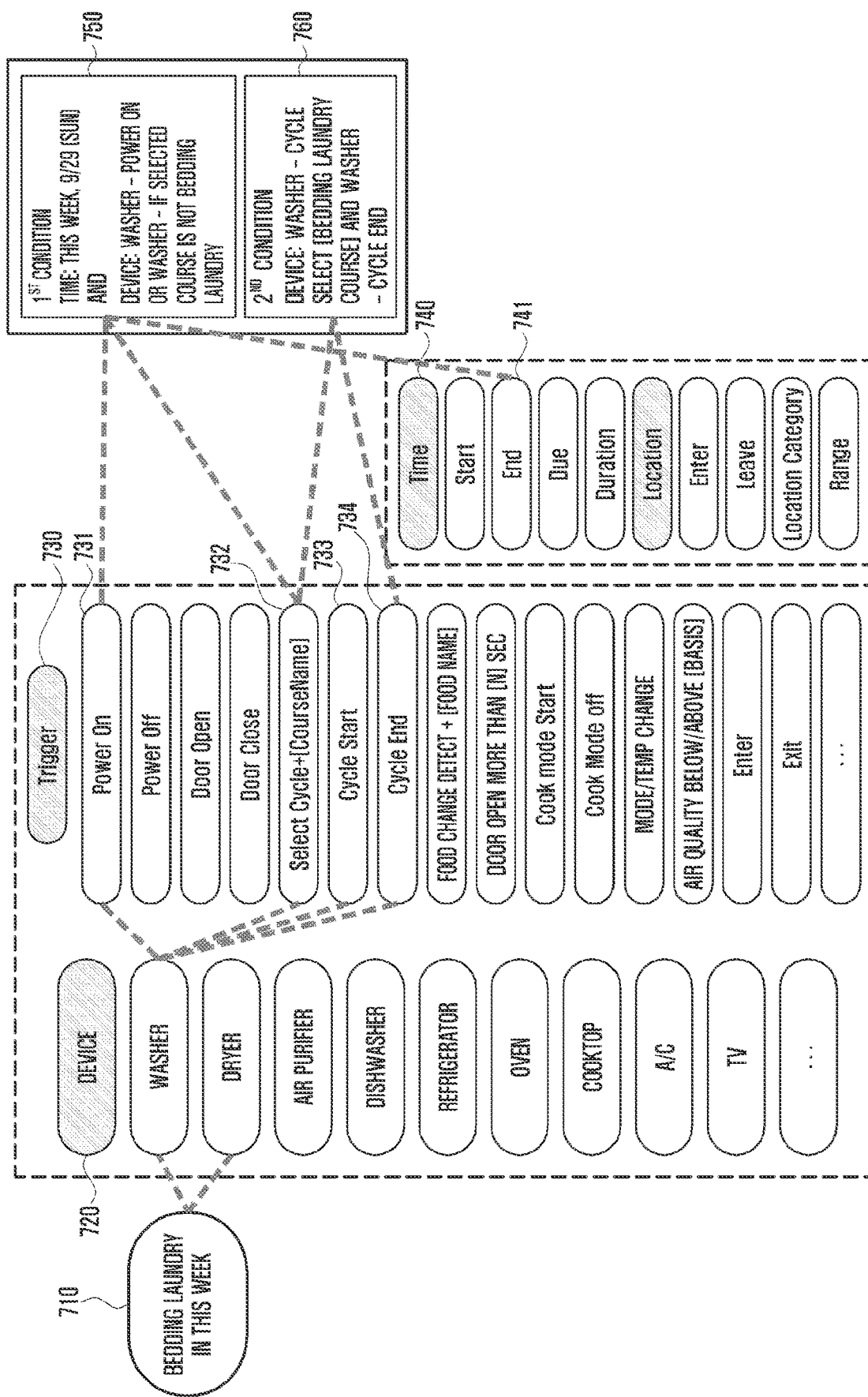

ELECTRONIC DEVICE FOR SUPPORTING TASK MANAGEMENT SERVICE AND OPERATING METHOD THEREOF

CROSS-REFERENCE TO RELATED APPLICATION(S)

This application is based on and claims priority under 35 U.S.C. § 119 to Korean Patent Application No. 10-2020-0011407, filed on Jan. 30, 2020, in the Korean Intellectual Property Office, the disclosure of which is incorporated herein by reference in its entirety.

BACKGROUND

1. Field

The disclosure relates generally to an electronic device, and more particularly, to an electronic device that supports notification of a progress status of a task to be performed by a user.

2. Description of Related Art

An electronic device may provide, through a display, a user interface that enables a user to manually set a reminder for a task to be performed. For example, the electronic device may receive a user input (reminder related information) about a time and/or a place from an input module (e.g., a touch screen) through an interface (e.g., a setting menu) supported by a calendar application. The electronic device may store the received information in a memory in association with the task and, based on the stored information, notify a reminder for the task. For example, the electronic device may notify the reminder at a set time and/or when the electronic device is located at a set place.

If the reminder is not set in the electronic device, the user may forget a task to be performed, and thus the task to be performed may not be performed at appropriate time and place. In addition, even if the reminder is set in the electronic device, it is difficult in the conventional art for the user to check whether the task has been properly performed and/or how the task has been performed.

Therefore, there is a need in the art for an electronic device that expands on the task notification and reminders of the conventional art, so as to more conveniently assist the user.

SUMMARY

The disclosure is provided to address at least the above-mentioned problems and/or disadvantages and to provide at least the advantages described below.

Accordingly, an aspect of the disclosure is to provide an electronic device capable of reminding a user of a task to be performed, without requiring the user to manually set a reminder, and automatically recognizing the completion of the task to notify the user.

In accordance with an aspect of the disclosure, an electronic device may include a communication circuit, a memory, and a processor connected to the communication circuit and the memory, wherein the memory stores instructions causing, upon executed, the processor to store, in the memory, identification information for identifying a plurality of user devices, select, by using task data including information indicating a task to be performed, a target device to be monitored from among the user devices and generate a reminder condition and a task completion condition, based on receiving a first operation history satisfying the reminder condition from the target device through the communication circuit, transmit a reminder message for the task to a designated user device through the communication circuit, and based on receiving a second operation history satisfying the task completion condition from the target device through the communication circuit, transmit a completion message of the task to the designated user device through the communication circuit and terminate monitoring.

In accordance with another aspect of the disclosure, an electronic device may include a communication circuit, a memory, and a processor connected to the communication circuit and the memory, wherein the memory stores instructions causing, upon executed, the processor to store, in the memory, identification information for identifying a plurality of user devices, select, by using task data including information indicating a task to be performed, a target device to be monitored from among the user devices and generate a reminder time and a task completion condition, transmit, at the reminder time, a reminder message for the task to a designated user device through the communication circuit, and based on receiving an operation history satisfying the task completion condition from the target device through the communication circuit, transmit a completion message of the task to the designated user device through the communication circuit and terminate monitoring.

In accordance with another aspect of the disclosure, a mobile electronic device may include a display, a wireless communication circuit, a memory, and a processor connected to the display, the wireless communication circuit, and the memory, wherein the memory stores instructions causing, upon executed, the processor to store, in the memory, identification information for identifying a plurality of user devices, select, by using task data including information indicating a task to be performed, a target device to be monitored from among the user devices and generate a reminder condition and a task completion condition, based on receiving a first operation history satisfying the reminder condition from the target device through the wireless communication circuit, display a reminder message for the task on the display, and based on receiving a second operation history satisfying the task completion condition from the target device through the communication circuit, display a completion message of the task on the display to terminate monitoring.

In accordance with another aspect of the disclosure, a method of operating an electronic device includes selecting, by using task data including information indicating a task to be performed, a target device to be monitored from among user devices and generating a reminder condition and a task completion condition, based on receiving a first operation history satisfying the reminder condition from the target device through a communication circuit of the electronic device, transmitting a reminder message for the task to a designated user device among the user devices through the communication circuit, and based on receiving a second operation history satisfying the task completion condition from the target device through the communication circuit, transmitting a completion message of the task to the designated user device through the communication circuit to terminate monitoring.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 7 illustrates operations of generating reminder and task completion conditions by using task data according to an embodiment;

DETAILED DESCRIPTION

Hereinafter, embodiments of the disclosure will be described in detail with reference to the accompanying drawings. Detailed descriptions of known functions and/or configurations will be omitted for the sake of clarity and conciseness.

Figure 1:
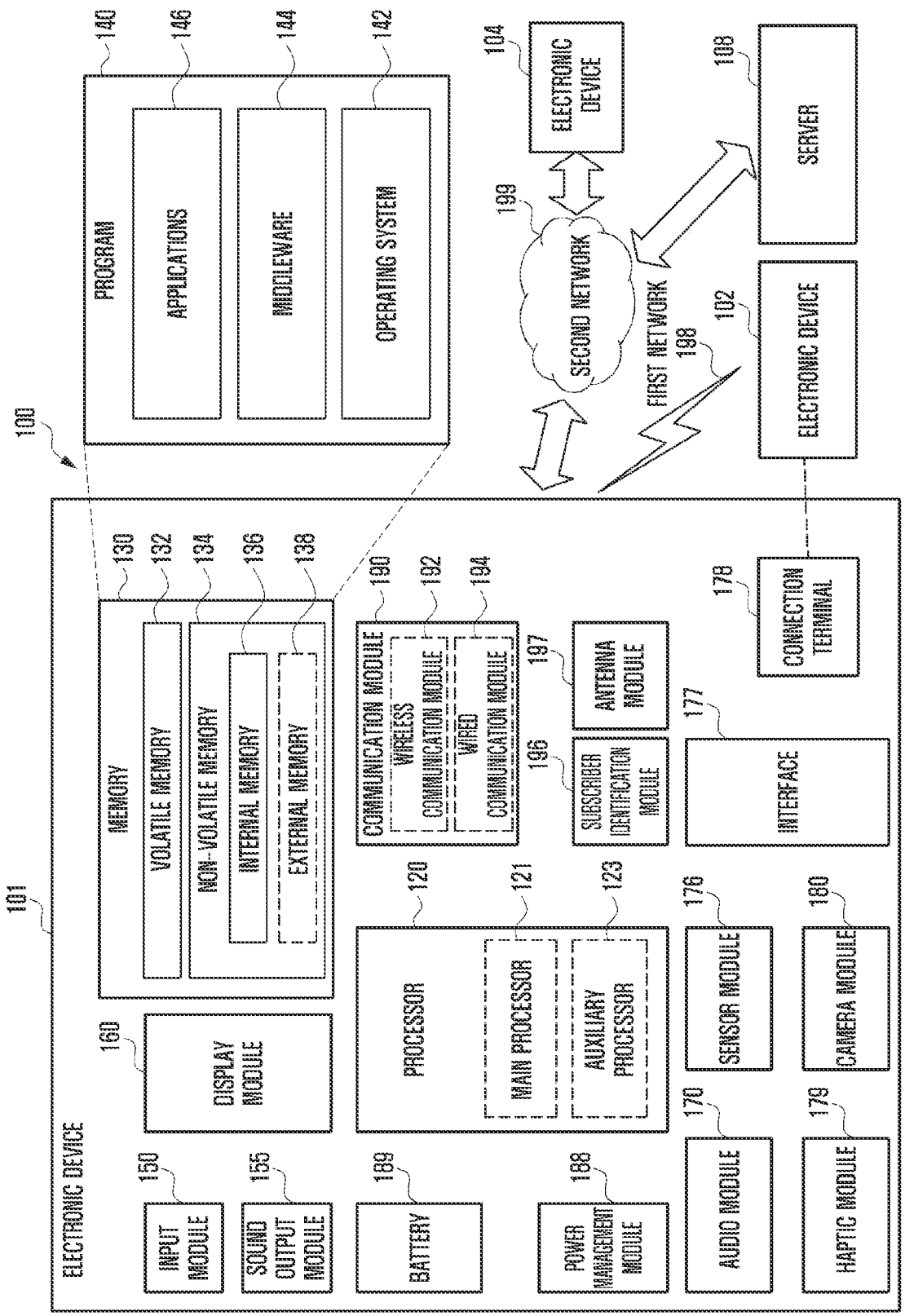
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. The auxiliary processor 123 (e.g., a neural processing unit) may include a hardware structure specialized for processing an artificial intelligence model. Artificial intelligence models can be created through machine learning. Such learning may be performed in the electronic device 101 itself on which artificial intelligence is performed, or may be performed through a separate server (for example, the server 108). The learning algorithm may include supervised learning, unsupervised learning, semi-supervised learning, or reinforcement learning, but is not limited the above-described example. The artificial intelligence model may include a plurality of artificial neural network layers. Artificial neural networks may include a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more of the above, but is not limited to the above-described example. In addition to the hardware structure, the artificial intelligence model may additionally or alternatively include a software structure.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include a microphone, a mouse, a keyboard, or a digital pen (e.g., a stylus pen).

The sound output module 155 may output sound signals to the outside of the electronic device 101. The sound output module 155 may include a speaker or a receiver. The speaker may be used for general purposes, such as playing multimedia or playing record, and the receiver may be used for an incoming calls. The receiver may be implemented as separate from, or as part of the speaker.

The display module 160 may visually provide information to the outside (e.g., a user) of the electronic device 101. The display module 160 may include a display, a hologram device, or a projector and control circuitry to control a corresponding one of the display, hologram device, and projector. The display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. According to one embodiment, the power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology after a 4G network a new radio (NR) access technology. The NR access technology may support high-speed transmission of high-capacity data (enhanced mobile broadband (eMBB)), minimization of terminal power and connection of multiple terminals (massive machine type communications (eMTC)), or high reliability and low latency (ultra-reliable and low-latency (URLLC)). The wireless communication module 192 may support a high frequency band (e.g., mmWave band) to achieve a high data rate. The wireless communication module 192 may support various technologies for securing performance in a high frequency band beamforming, massive MIMO (multiple-input and multiple-output), FD-MIMO (full dimensional MIMO), array antennas, analog beam-forming, or large scale antennas. The wireless communication module 192 may support various requirements specified in the electronic device 101, an external electronic device (e.g., the electronic device 104), or a network system (e.g., the second network 199). The wireless communication module 192 may support a peak data rate for realizing eMBB (e.g., 20 Gbps or more), loss coverage for realizing mMTC (e.g., 164 dB or less), or U-plane latency for realizing URLLC (e.g., downlink (DL) and uplink (UL) each 0.5 ms or less, or round trip 1 ms or less).

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. The mmWave antenna module may include a printed circuit board, an RFIC that is disposed on or adjacent to a first side (e.g., a lower side) of the printed circuit board and capable of supporting a designated high frequency band (e.g., mmWave band), and a plurality of antennas (e.g., array antennas) that are disposed on or adjacent to the second side (e.g., top or side) of the printed circuit board and capable of transmitting or receiving a signal of the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, MEC (mobile edge computing), or client-server computing technology may be used, for example. The electronic device 101 may provide an ultra-low delay service using distributed computing or mobile edge computing. The external electronic device 104 may include an Internet of things (IoT) device. The server 108 may be an intelligent server using machine learning and/or neural networks. The external electronic device 104 or the server 108 may be included in the second network 199. The electronic device 101 may be applied to an intelligent service (e.g., smart home, smart city, smart car, or healthcare) based on 5G communication technology and IoT-related technology.

The electronic device according to various embodiments may be one of various types of electronic devices. The electronic devices may include a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such expressions as "A or B," "at least one of A and B," "at least one of A or B," "A, B, or C," "at least one of A, B, and C," and "at least one of A, B, or C," may include any one of, or all possible combinations of the items enumerated together in a corresponding one of the expressions. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This enables the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed on different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more in steps may be executed in a different order or omitted, or one or more other operations may be added.

Figure 2:
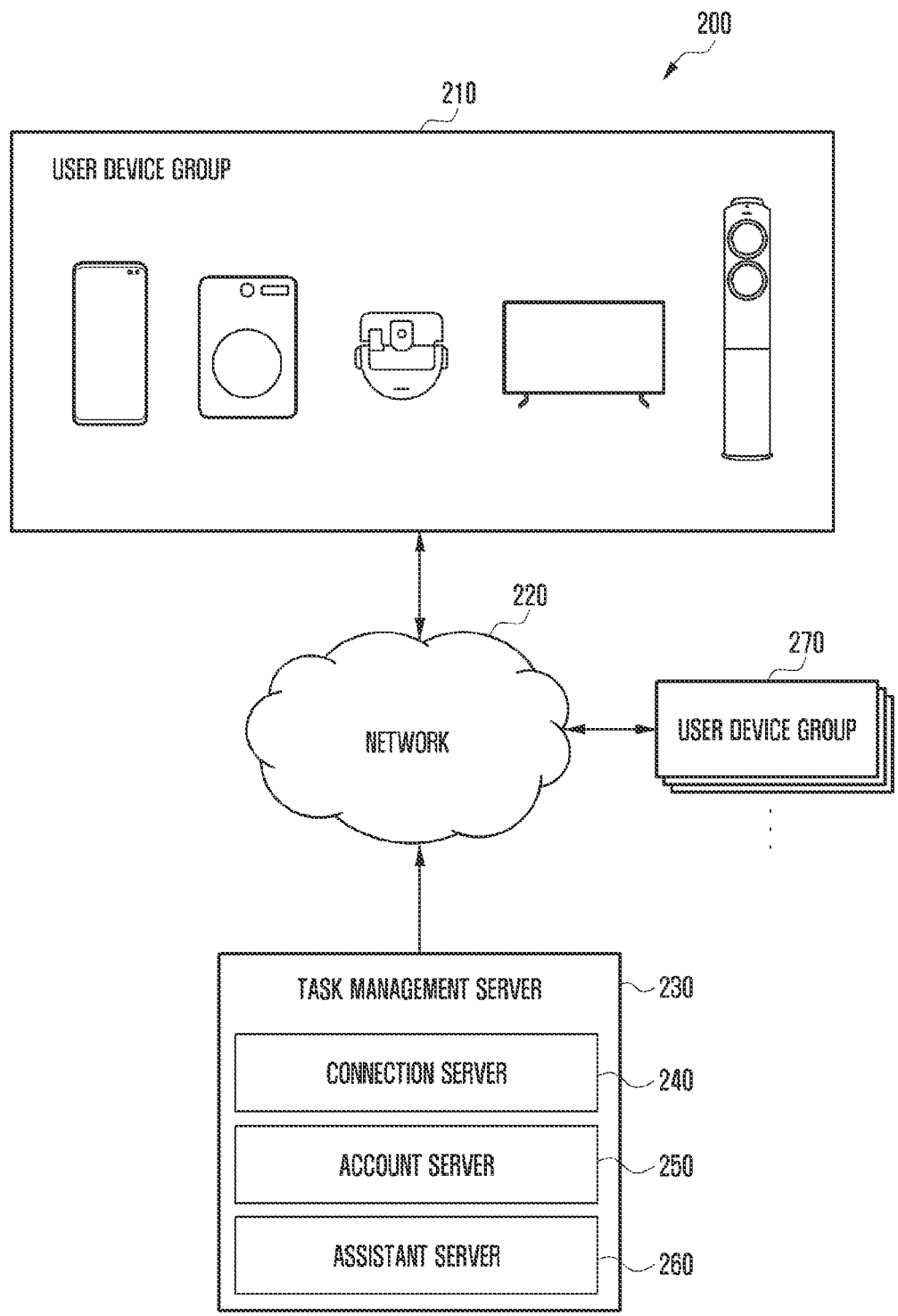
FIG. 2 illustrates a network environment supporting a service for managing a user's task according to an embodiment.

FIG. 2 illustrates a network environment 200 supporting a service for managing a user's task according to an embodiment. Referring to FIG. 2, in the network environment 200, a user device group 210 is capable of communicating with a task management server 230 (e.g., a cloud server) through a network 220 (e.g., the second network 199 in FIG. 1). The task management server 230 is also capable of communicating with one or more other user device groups 270 through the network 220.

A user device that participates (or is registered) in the user device group 210 may include one or more components identical to those of the electronic device 101 shown in FIG. 1, such as the processor 120, the memory 130, the input module 150, the sound output module 155, the display module 160, the audio module 170, the sensor module 176, the communication module 190, and/or the antenna module 197.

The user device group 210 may contain a plurality of user devices including at least one mobile device (e.g., a smart phone), at least one computer device (e.g., a notebook PC, a desktop PC), at least one wearable device (e.g., a smart watch), and a plurality of home appliances (e.g., a washer, a robot cleaner, a refrigerator, a TV, or an air conditioner). At least one user device (e.g., home appliance) in the user device group 210 may be located within a geographically designated area (e.g., home) and may be used in common by members of a corresponding user group. In the area, a positioning sensor (e.g., a camera) capable of generating data used to track a user's location may be disposed. Therefore, the positioning sensor may be included as a member of the user device group 210. Between user devices in the group 210, communication for data transmission/ reception or remote control may be performed through an access point located in the area or by using a peer to peer (P2P) communication technique (e.g., Wi-Fi Direct or Bluetooth™). Communication between user devices in the group 210 may also be performed through the network 220. For example, a processor of a mobile device may be configured to monitor statuses of other user devices in the group 210 by using a wireless communication circuit of the mobile device and to control, based on a monitoring result, operations of the user devices.

The user device in the group 210 may provide task data containing information indicating a task to be performed to the task management server 230. In the disclosure, the term 'task' may refer to a user's to-do list or any other task which is inputted by a user into a user device but may be performed by any other member of the user group. A user device may receive a user input (e.g., a touch input on a certain date in a calendar displayed on the display) of requesting a user interface to enable the user to create a task through an application (e.g., a calendar or reminder app). In response to the user input, the user device may display the requested user interface (e.g., a task creation screen) on the display. Then, the user device may transmit task data (e.g., "bedding laundry this week"), created through the user interface, to the task management server 230 by using a communication circuit. As such, the user device that creates the task data may insert identification information (e.g., a mobile phone number) thereof in the task data to be transmitted to the task management server 230.

The user device in the group 210 may collect an operation history (i.e., a usage history) indicating the use of the user device group 210 by member(s) and provide it to the task management server 230. For example, among user devices, at least one specific device may be selected as a target device to be monitored by the server 230. The target device may collect the operation history and provide it to the task management server 230. The task management server 230 may recognize an operating status of the target device (e.g., an operating status (e.g., power on) of a user device that triggers a reminder, an operating status (e.g., end of a function, power off) of a user device that triggers a task completion), based on a monitoring result (i.e., the operation history) for the target device, and then support a task management (e.g., a reminder for a task and/or a notification for a completed task), based on the recognized status.

Each of user devices may collect the operation history during a given period of time and transmit it to the task management server 230. The operation history may contain functional information indicating a particular function (or operating status) having been performed (or being performed) in response to a user's manipulation (or remote control of any other user device), and setting information indicating a particular setting (or option) applied to such functions. For example, if the user device is a mobile device or a wearable device, the functional information may include location information. If the user device is a washer (i.e., washing machine), the functional information may include standard wash, bedding wash, powerful wash, wool wash, or outdoor wash, and the setting information may include a water temperature, the number of rinses, or a spin-dry strength. If the user device is a TV, the functional information may include a standard mode, and the setting information may include backlight, brightness, contrast, or sharpness. If the user device is an electric stove, the functional information may include a turbo mode, and the setting information may include cooking zone, firepower, flex (e.g., using two cooing zones simultaneously), or lighting. If the user device is an air conditioner, the functional information may include a sleep mode, and the setting information may include driving time, wind direction, wind speed, or temperature.

The user device in the group 210 may collect a user profile (or personal information) and provide it to the task management server 230. For example, the user device may receive the user profile (e.g., name, age, address, relationship with other members, mobile phone number, or account information such as an email address) from the user through an input module or a touch-sensitive display. The user device may transmit the received user profile to the task management server 230.

The user device in the group 210 may provide device information (e.g., a device type (e.g., brand name, model name), information on functions and settings, or a manual) to the task management server 230. The user device may display a screen for registering any electronic device as a new member of the group 210. The user device may recognize the presence of a new electronic device (e.g., a home appliance) (hereinafter, an unregistered device) not registered in the group 210 by scanning a wireless communication channel (e.g., a WiFi communication channel) through the wireless communication circuit, and display the identification information of the unregistered device on the registration screen. The user device may receive a user's selection of the unregistered device through the registration screen and establish a wireless communication channel for communication with the selected unregistered device. The user device may receive device information from the unregistered device through the established wireless communication channel, and transmit the received device information to the task management server 230 to register the unregistered device as a new member of the group 210 in the task management server 230.

The task management server 230 may be composed of a plurality of electronic devices that are physically or functionally separated. For example, the task management server 230 may include a connection server (or monitoring server) 240, an account server 250, and an assistant server 260. At least one of the servers 240, 250, and 260 may include one or more components identical to those of the electronic device 101 shown in FIG. 1 (e.g., the processor 120, the memory 130, the communication module 190, and/or the antenna module 197). The servers 240, 250, and 260 may be configured in a module form (i.e., a monitoring module, an account module, and an assistant module), thus constructing one united server. A memory of the server may store instructions that cause, when executed by a processor of the server, the processor to perform the functions of the modules. The processor of the server may be configured to perform the functions of the modules, which may be constructed as group-dedicated modules in any one of the user devices in the group 210. For example, at least one of the user devices in the group 210 may be configured to perform the same function(s) (e.g., an operation of notifying a task to be performed to the user when a predetermined remind condition is satisfied, and/or an operation of notifying a task completion to the user when a predetermined completion condition is satisfied) as at least one of the functions of the modules. For example, the memory of the mobile device may store instructions that cause, when executed by the processor, the processor to perform the operation.

The connection server 240 (e.g., an IoT server) may deliver data received from the user device group 210 to the account server 250 or the assistant server 260, and also deliver data received from the assistant server 260 to user devices in the user device group 210. For example, the connection server 240 may receive a registration request message containing device information from a user device and deliver the device information to the account server 250 and the assistant server 260. In addition, the connection server 240 may monitor a user device (e.g., a target device) or receive a monitoring result (e.g., an operation history, location information), and deliver the monitoring result to the assistant server 260. The assistant server 260 may store the received result in a monitoring database (DB). The connection server 240 may receive information related to reminder and/or task completion from the assistant server 260 and deliver it to a user device (e.g., a mobile device and/or a target device). The connection server 240 may receive a user profile from a user device and deliver it to the account server 250.

The account server 250 may store, in a device information DB, device information of the user device group 210 received from a user device through the connection server 240. The account server 250 may store, in a user profile DB, a user profile received from a user device through the connection server 240.

The assistant server 260 may generate a first condition (or reminder condition) for offering a reminder by using task data. For example, using an artificial intelligence (AI) algorithm (e.g., a natural language understanding (NLU) module), the assistant server 260 (e.g., an AI server) may perform syntactic analysis and/or a semantic analysis on task data and thereby generate information indicating a reminder trigger time, a monitoring target (target device), a user device (e.g., a target device and/or a mobile device) to perform the reminder, and/or a first status (e.g., an operating status (e.g., power on) of a home appliance, a location of a mobile device or wearable device or a change thereof) of a user device (e.g., a target device) that triggers the reminder.

The assistant server 260 may generate a second condition (or completion condition) for determining the completion of a task by using task data. For example, the assistant server 260 may perform the analysis using the above AI algorithm and thereby generate information indicating a task completion trigger time, a second status (e.g., an operating status (e.g., end of a function, power off) of a home appliance, a location of a mobile device or wearable device or a change thereof) of a user device (e.g., a target device) that triggers the completion of a task, and/or a user device (e.g., a target device and/or a mobile device) to perform a notification for the completion of a task.

The assistant server 260 may transmit the first condition and/or the second condition to the user device such that the user device displays a user interface with the first condition and/or the second condition on the display. The assistant server 260 may identify, from task data, a user device having transmitted the task data and then select the identified user device as a user device to receive the first condition and/or the second condition. The assistant server 260 may also identify a user's mobile device among user devices, based on a user profile (e.g., a mobile phone number) registered in the account server 250, and then select the identified mobile device as a user device to receive the first condition and/or the second condition. The user device may display, on the display, a user interface containing an item enabling the user to edit the first condition and/or the second condition. The user device may transmit the edited condition to the assistant server 260 such that the assistant server 260 compares the edited condition with a monitoring result (e.g., an operation history).

The assistant server 260 may determine, by using a previously stored mapping table as illustrated below in Table 1, a first status (i.e., a status of a user device that triggers a reminder) to be included in the first condition and/or a second status (i.e., a status of a user device that triggers a task completion) to be included in the second condition.

TABLE 1

| Device-related keywords (natural language) | Device | State |
|---|---|---|
| Not applicable | Common | Power on (1st status)<br>Power off (2nd status)<br>Door open (1st status)<br>Door closed (2nd status)<br>Child lock set<br>Child lock release |
| Wash, laundry, washer, clothes, child clothes, child clothes wash, bedding, bedding wash, child bedding wash | Washer | Common trigger set<br>Select cycle + [course name] (1st status)<br>Wash cycle start<br>Wash cycle end (2nd status) |
| Dryer, clothes drying, drying, clothes, child clothes, child clothes drying, bedding, bedding drying, child bedding drying, spin drying | Dryer | Common trigger set<br>Dry cycle start<br>Dry cycle end (2nd status) |
| Fine dust, damp, clean, dry, after going out, coat, coat care | Clothes Manager | Common trigger set<br>Cycle start<br>Cycle end (2nd status) |
| Dishwasher, washing dishes, cooking [food], eating [food], after eating, organizing | Dishwasher | Common trigger set<br>Cycle start<br>Cycle end (2nd status) |
| Refrigerator, shopping, mart, meals, making food, preparing meals, preparing [food], eating [food], dieting, child food | Refrigerator | Detecting changes in stored food + [Food Name]<br>When the door opens [N] sec or more |
| Cooking, oven, cake making, meat, pork belly, fish, hot food, warming, baking, cookies, bread, cooking [food], warming [food], preparing [food] | Oven | Cook mode start<br>Cook mode off (2nd status) |
| Air conditioner, room temperature, hot, cold, filter, filter replacement, power saving, energy, cold, humid | Air Conditioner | Start<br>Mode/temperature change (1st status)<br>End (2nd status) |
| Fine dust, pleasant, refreshing, movie, invitation, guest, cooking, baby, stuffy, air, air management, air quality, filter, filter replacement | Air Purifier | Start<br>When air quality reaches below/above [standard] (1st status)<br>End (2nd status) |
| TV, watch, movie, watch TV, watch [contents name] | TV | Power on (1st status)<br>Standby mode (1st status)<br>Power off (2nd status) |
| Going out, going home, locking, door lock, safety, security, thorough security, lock check, [who] goes out | Door Lock | Enter (1st status or 2nd status)<br>Exit (1st status or 2nd status) |
| Walking, jogging, running, shopping | Mobile Device or Wearable Device | Place-related keywords in task data (1st status or 2nd status)<br>Keywords related to variation of places in task data (1st status or 2nd status) |

Sound-related keywords (e.g., movie study, class, sleep, etc.) may be added to the mapping table, and such sound-related keywords may be associated with at least one of a washer, a clothes manager, a dishwasher, a robot cleaner, and a TV. In addition, temperature-related keywords (e.g., movie, meal, children, invitation, sleep, travel, exercise, illness, autumn leaves, first snow, rainy season, etc.) may be added to the mapping table and associated with at least one of an oven, an air conditioner, a window opener, and a heating controller. Security-related keywords (e.g., invitation, delivery, visit, sitter, babysitter, travel, vacation, announcement, etc.) may be added to the mapping table and associated with at least one of a window opener and a door lock. Air conditioning related keywords (e.g., meal, cooking, children, invitation, travel, exercise, etc.) may be added to the mapping table and associated with at least one of a dryer, a clothes manager, an air conditioner, a window opener, and an air purifier. Illumination-related keywords (e.g., movie, invitation, party, etc.) may be added to the mapping table and associated with at least one of a TV and a light fixture. Cleanliness-related keywords (e.g., travel, exercise, children, yoga, night, concert, performance, etc.) may be added to the mapping table and associated with at least one of a washer, a dryer, a clothes manager, a dishwasher, a robot cleaner, and an air purifier.

The assistant server 260 may recognize a keyword related to a user device from task data and may recognize a user device corresponding to the recognized keyword from the mapping table in Table 1. For example, the assistant server 260 may recognize a user device corresponding to "laundry" from Table 1 as a washer and/or a dryer and may determine the recognized device as a target device to be monitored.

The assistant server 260 may select the first status corresponding to the recognized device from the mapping table. For example, the assistant server 260 may determine "power on" and "door open" as the first status commonly corresponding to user devices, regardless of device types. In another example, from among statuses corresponding to the recognized device (e.g., washer), the assistant server 260 may determine "select cycle+[course name]" as the first status for triggering the reminder.

The assistant server 260 may select the second status corresponding to the recognized device from the mapping table. For example, the assistant server 260 may determine "power off" and "door closed" as the second status commonly corresponding to user devices, regardless of device types. In another example, from among statuses corresponding to the recognized device (e.g., washer), the assistant server 260 may determine "wash cycle end" as the second status for triggering the task completion.

The assistant server 260 may receive, from a target device through the connection server 250, a monitoring result (e.g., an operation history) for the target device selected as a monitoring target. Then, the assistant server 260 may determine whether the monitoring result corresponds to the first condition. The assistant server 260 may determine whether the first operation history of the user device acquired as the monitoring result corresponds to the first status.

When the first operation history acquired as the monitoring result corresponds to the first status, the assistant server 260 may control the user device to perform a reminder to inform the user that there is a task. For example, the assistant server 260 may select a target device and/or a mobile device as the user device to perform the reminder, based on information about a reminder device contained in the first condition. The assistant server 260 may identify a user's mobile device among user devices, based on a user profile (e.g., a mobile phone number) registered in the account server 250, and select the mobile device as a reminder device. The assistant server 260 may transmit a reminder message to the selected user device (e.g., a target device and/or a mobile device). Then, the user device may display, on the display, the reminder message received from the assistant server 260 or an indicator for notifying the user that such a message has been received.

The assistant server 260 may transmit a reminder message to a user device at a reminder time.

The assistant server 260 may receive, from a user's mobile device, information indicating a place where the mobile device is located. If the received place information corresponds to a place condition (e.g., a market) contained in the first condition, the assistant server 260 may transmit a reminder message to the user device.

The assistant server 260 may track the location of a user's mobile device in real time from location information periodically received from the mobile device. Based on a tracking result, the assistant server 260 may recognize a change in a place where the user is located. If the recognized change in a place corresponds to a place change condition (e.g., leaving a company) contained in the first condition, the assistant server 260 may transmit a reminder message to the user device.

In addition, the assistant server 260 may determine whether the monitoring result corresponds to the second condition. The assistant server 260 may determine whether the second operation history acquired as the monitoring result corresponds to the second status.

When the second operation history acquired as the monitoring result corresponds to the second status, the assistant server 260 may control the user device to perform a task completion notification. For example, the assistant server 260 may select a target device and/or a mobile device as a user device to perform the completion notification and transmit a completion message to the selected user device.

When the second operation history corresponds to the second status (e.g., cooktop operation completion) and when place information (or information indicating a change of place) acquired as a result of location tracking corresponds to a place (or place change) condition (e.g., leaving a home, or leaving a park) contained in the second condition, the assistant server 260 may control the user device to perform the task completion notification at a task completion time (e.g., after 6 PM).

When the monitoring result satisfies the second condition, the assistant server 260 may terminate monitoring. For example, the assistant server 260 may transmit, to the user device, a message that instructs the user device to stop collecting the operation history and/or location information.

The user device may display, on the display, the completion message received from the assistant server 260 or an indicator for notifying that such a message has been received. For example, the user device may display a user interface containing the completion message on the display. Additionally, the user device may add, to the displayed user interface, an item (e.g., a completion cancel button) enabling the user to cancel the completion of a task and/or an item (e.g., a completion condition creation screen) enabling the user to correct a task completion condition (e.g., the state of a target device). When the completion is cancelled through the user interface (e.g., when a touch input on the completion cancel button is received from the touch-sensitive display), the user device may transmit a cancellation message to the assistant server 260. Upon receiving the cancellation message, the assistant server 260 may resume monitoring. When the task completion condition is corrected, the user device may transmit a correction message to the assistant server 260. Upon receiving the correction message, the assistant server 260 may resume the monitoring and update the mapping table, based on the correction message (e.g., a status correction result).

Operations of the assistant server 260 (e.g., generating the first condition and/or the second condition, selecting the target device, monitoring the target device, determining whether the monitoring result corresponds to the first condition or the second condition, or performing the reminder or the completion notification) may be performed by one of members of the user device group 210.

A specific status in the mapping table (e.g., door open in Table 1) may be determined as the first status by being combined with user information (e.g., location information, identification information). For example, the assistant server 260 may receive a washer operation history (e.g., door open) from the washer through the connection server 250. When the operation history is received, the assistant server 260 may also receive, from a sensor (e.g., a camera, or a sensor (e.g., an ultrasonic sensor, an infrared sensor, or a fingerprint sensor) attached to a door) located near or mounted on the washer, sensing data indicating that the user is located near the washer or indicating the identity of the user. When the operation history and the sensing data correspond to the first status combined with the user information, the assistant server 260 may determine the need to send a task reminder to the user.

A specific state in the mapping table (e.g., door closed in Table 1) may be determined as the second status by being combined with user's location information. For example, the assistant server 260 may receive the sensing data from the connection server 250 together with a washer operation history (e.g., door closed). When the operation history and the sensing data correspond to the second status combined with the location information, the assistant server 260 may determine that the task is completed.

Figure 3:
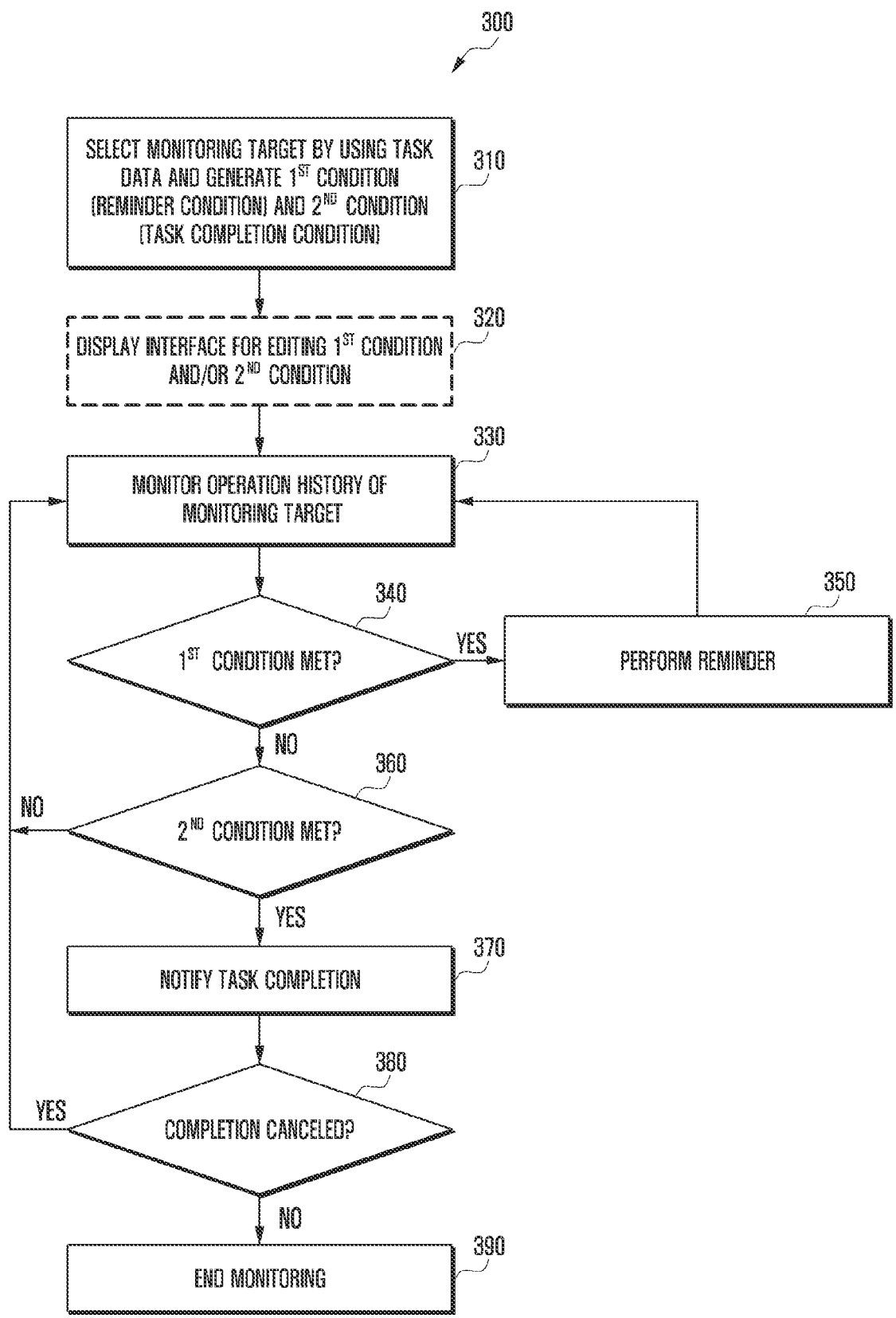
FIG. 3 illustrates operations of supporting a task management service according to an embodiment.

FIG. 3 illustrates operations 300 of supporting a task management service according to an embodiment. In FIG. 3, the operations 300 may be performed by a processor of the task management server 230 (e.g., a processor of the assistant server 260) or a processor of a user device in the group 210 (e.g., a processor of a mobile device).

In step 310, using task data, the processor may select a target device to be monitored from among user devices and generate a first condition (i.e., a reminder condition) and a second condition (i.e., a task completion condition). The processor may identify, from among keywords in the task data, a keyword that matches a keyword contained in a mapping table (e.g., Table 1). The processor may identify a target device corresponding to the identified keyword from the mapping table, and may determine a first status and second status of the target device by using the mapping table. For example, from among statuses corresponding to a washer recognized as the target device in the mapping table, the processor may determine a status "select cycle+[course name]" as the first state for triggering a reminder. Also, from among the statuses corresponding to the washer, the processor may determine another status "wash cycle end" as the second status for triggering a task completion. In addition, the processor may identify common statuses of user devices from the mapping table, add at least one of these common statuses (e.g., "power on") to the first status, and add at least another one (e.g., "power off") to the second status.

In step 320, the processor may display a user interface for editing the first condition and/or the second condition on the display of the user device. When the task management server 230 is an entity that generates such conditions, the processor thereof may select a user device (e.g., a user's mobile device) from among user devices in the group 210, based on the task data or a user profile, and transmit the first condition and/or the second condition to the selected user device. Then, the user device may display the editing interface on a display thereof (e.g., a touch-sensitive display). In addition, the user device may transmit a condition edited through the editing interface to the task management server 230 such that the task management server 230 can compare the edited condition with a monitoring result (e.g., operation history). The task management server 230 may update the mapping table, based on the edited condition. According to another embodiment, when a user device generates the above conditions, the processor thereof may transmit the first and second conditions to the task management server 230 such that the task management server 230 can manage a task reminder and a task completion. The processor may display the editing interface on the display and transmit the edited condition to the task management server 230.

In step 330, the processor may monitor the operation history of the target device by performing data communication with the target device selected as a monitoring target from among user devices in the group 210 through the wireless communication circuit. Step 330 may be performed without performing step 320 (that is, without editing conditions by the user).

In step 340, the processor may determine whether the operation history acquired as a monitoring result satisfies the first condition. If it is determined to be not satisfied (i.e., "NO" in step 340), the processor may perform step 360 to be described below.

If it is determined to be satisfied (i.e., "YES" in step 340), the processor may perform a reminder in step 350. When a determining entity is the task management server 230, the processor thereof may select a user device from among user devices in the group 210, based on the first condition or a user profile, and transmit a reminder message to the selected user device. Then, the user device may display, on the display, the reminder message or an indicator for informing the user that such a message has been received. When a user device is the determining entity, the processor thereof may remind the user that there is a task to be performed. For example, the processor may display a pop-up window for showing task-related information on the display.

In step 360, the processor may determine whether the operation history acquired as a monitoring result satisfies the second condition. If it is determined not to be satisfied (i.e., "NO" in step 360), the processor may return to step 330 and continue to perform monitoring.

If it is determined to be satisfied (i.e., "YES" in step 360), the processor may perform a task completion notification in step 370. When a determining entity is the task management server 230, the processor thereof may transmit a completion message to a user device (e.g., a reminder device). Then, the user device may display, on the display, the completion message or an indicator for informing the user that such a message has been received. Upon receiving the completion message, the user device may display, on the display, a user interface enabling the user to cancel the completion. When the completion is cancelled through the user interface (e.g., when a touch input on a completion cancel button is received from the touch-sensitive display), the user device may transmit a cancellation message to the task management server 230. When a user device is the determining entity, the processor thereof may display, on the display, a user interface for informing the user that the task is completed. The processor may add an item (e.g., a cancel button) for cancelling completion to the displayed user interface.

In step 380, the processor may determine whether task completion is cancelled by the user. If cancelled (i.e., "YES" in step 380), the processor may return to step 330 and resume monitoring the operation history of the target device. If not cancelled (i.e., "NO" in step 380), the processor may terminate monitoring the operation history of the target device in step 390.

Figure 4:
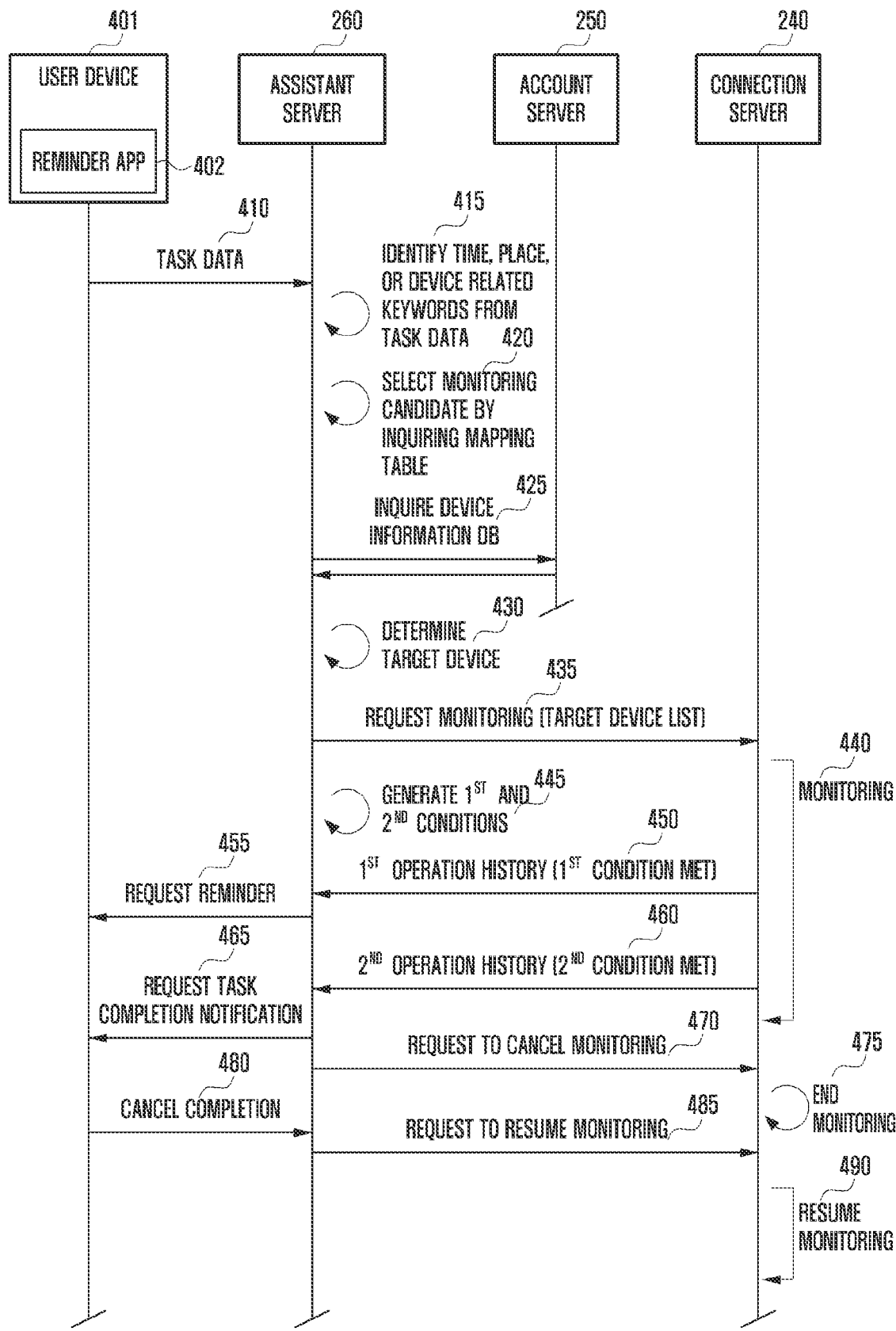
FIG. 4 illustrates operations of supporting a task management service according to an embodiment.

FIG. 4 illustrates operations 400 of supporting a task management service according to an embodiment. In FIG. 4, a user device 401 may be a user device having a reminder application 402 installed therein among user devices in the group 210.

In step 410, the user device 401 may transmit task data to the assistant server 260. For example, the user device 401 may execute the reminder application 402 and display a screen for enabling the user to create a task on the display. The user device 401 may store task data inputted through the task creation screen and transmit it to the assistant server 260.

In step 415, the assistant server 260 may identify time, place, or device related keywords from the task data by analyzing the meaning of the task data through an AI algorithm (e.g., a natural language understanding module). For example, if the task data is "bedding laundry this week", the assistant server 260 may identify 'this week' as a time-related keyword and also identify 'bedding laundry' as a device-related keyword.

In step 420, the assistant server 260 may select a monitoring candidate corresponding to the device-related keyword from among user devices by referring to a mapping table in Table 1). For example, the assistant server 260 may recognize in Table 1 that devices related to 'bedding laundry' are a washer and a dryer and select the recognized devices as monitoring candidates.

In step 425, the assistant server 260 may perform an inquiry by referring to the device information DB stored in the account server 250.

In step 430, based on an inquiry result, the assistant server 260 may determine a target device to be monitored from among the monitoring candidates. For example, the assistant server 260 may recognize as a result of the DB inquiry that, among the candidates (i.e., the washer and the dryer), the washer is a device registered in the group 210, but the dryer is an unregistered device. Thus, the assistant server 260 may select the washer as a target device.

In step 435, the assistant server 260 may transmit a monitoring request message containing a target device list to the connection server 240.

In step 440, upon receiving the monitoring request message from the assistant server 260, the connection server 240 may monitor the operation history of the target device 403 in real time and transmit a monitoring result to the assistant server 260.

In step 445, the assistant server 260 may generate a first condition (or reminder condition) for triggering a reminder for the task and a second condition (or task completion condition) for triggering a task completion. For example, the first condition may include information indicating a first status (e.g., an operating status, a place where the target device is located, or a change in a place where the target device is located) of the target device that triggers the reminder. The first condition may further include information indicating a time to trigger the reminder or a reminder device. The second condition may include information indicating a second status (e.g., an operating status, a place where the target device is located, or a change thereof) of the target device that triggers the task completion. The second condition may further include information indicating a time to trigger the task completion.

In step 450, the assistant server 260 may receive a first operation history satisfying the first condition from the target device through the connection server 240. Then, in step 455, the assistant server 260 may transmit a reminder request message to the user device 401 to cause the user device 401 to perform the reminder. The assistant server 260 may recognize the target device as a reminder device together with the user device 401, based on information about the reminder device contained in the first condition. Thus, the assistant server 260 may also transmit the reminder request message to the target device.

In step 460, the assistant server 260 may receive a second operation history satisfying the second condition from the target device through the connection server 240. Then, in step 465, the assistant server 260 may transmit a message requesting a task completion notification to the user device 401 to cause the user device 401 to perform the task completion notification.

In step 470, upon receiving the second operation history satisfying the second condition, the assistant server 260 may transmit a message requesting cancellation of monitoring to the connection server 240. Then, in step 475, the connection server 240 may terminate monitoring the target device in response to the monitoring cancellation request.

The user device 401 may display a task completion message and an item (e.g., a completion cancel button) for cancelling completion in a user interface on the display. In step 480, when the completion is cancelled through the user interface (e.g., when a touch input on the completion cancel button is received from the touch-sensitive display), the user device 401 may transmit a cancellation message to the assistant server 260. In step 485, in response to receiving the cancellation message, the assistant server 260 may transmit a message requesting to resume monitoring to the connection server 240. The user device 401 may add an item (e.g., a completion condition creation screen) that enables a user to correct a task completion condition (e.g., a status of a target device) in the user interface displayed on the display. When the task completion condition is corrected, the user device 401 may transmit a correction message to the assistant server 260. Upon receiving the correction message, the assistant server 260 may transmit the request message for resuming monitoring to the connection server 240 and also update the mapping table, based on the correction message (e.g., a status correction result).

In step 490, the connection server 240 may resume real-time monitoring for the operation history of the target device 403 in response to the request to resume monitoring from the assistant server 260 and transmit a monitoring result to the assistant server 260.

Figure 5:
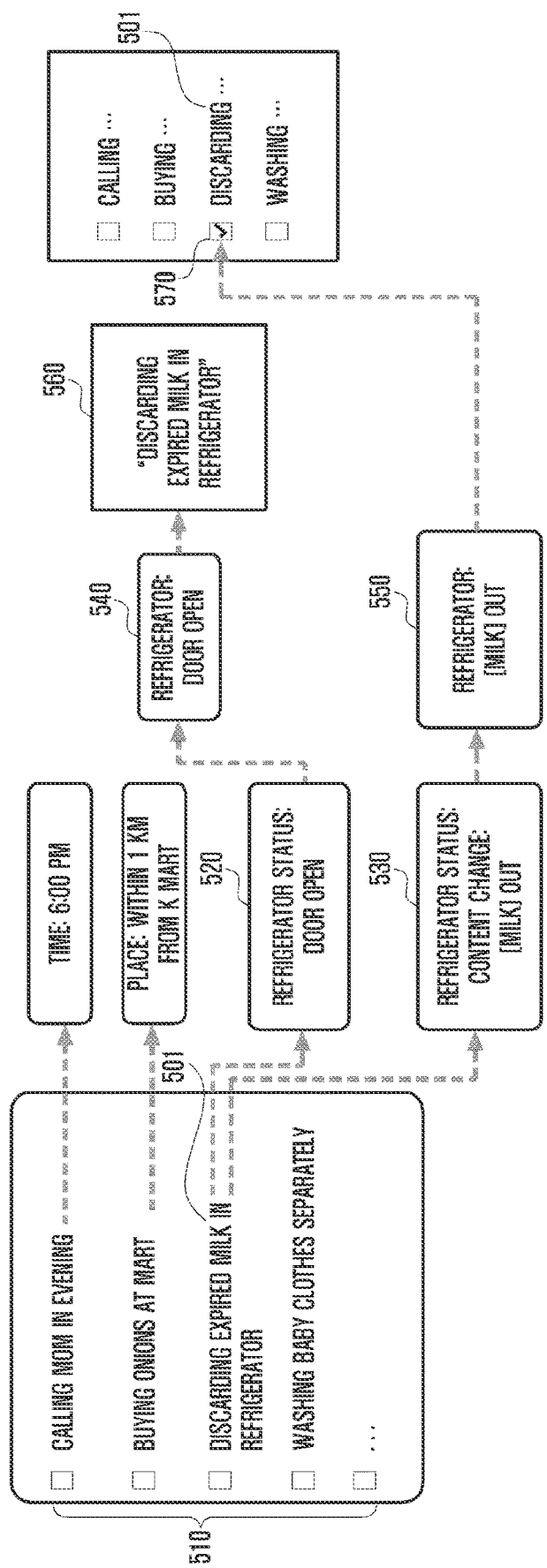
FIG. 5 illustrates operations of managing a refrigerator-related task according to an embodiment.

FIG. 5 illustrates operations of managing a refrigerator-related task according to an embodiment. The operations of FIG. 5 may be performed by a processor of the task management server 240 (e.g., the assistant server 260). Alternatively, the operations of FIG. 5 may be performed by a processor of a user device 401 in the group 210.

In FIG. 5, a task list 510 may be displayed on a display of the user device 401 in the group 210. The task list 510 may differentially indicate completed and incomplete tasks. For example, each task in the task list 510 may have a square box. The user can recognize that a checked box indicates the completed task and an unchecked box indicates the incomplete task.

The processor may perform a semantic analysis using an AI algorithm on task data indicating "discarding expired milk in refrigerator", which is a first incomplete task 501 in the task list 510, and thereby determine a target device as a refrigerator. Then, using the mapping table, the processor may determine a first condition 520 of the refrigerator for triggering a reminder as 'refrigerator status: door open'. Using the mapping table, the processor may determine a second condition 530 of the refrigerator for triggering a task completion as 'content change: [milk] out'.

The refrigerator may include a wireless communication circuit for data communication with the processor, and a sensor capable of generating data used to monitor the status of the refrigerator. For example, the refrigerator may include a sensor (e.g., a magnetic sensor attached to a door) for detecting the opening and closing of the door. The refrigerator may include a sensor (e.g., a camera capable of photographing an interior space of the refrigerator) for recognizing a type of stored contents and a change of the contents. The refrigerator may transmit data acquired through such a sensor to the processor by using the wireless communication circuit.

When first data 540 received from the refrigerator corresponds to the first condition 520, the processor may display a reminder message 560 on the display. When second data 550 received from the refrigerator corresponds to the second condition 530, the processor may perform a task completion notification. For example, a box 570 related to the first task 501 may be displayed in a checked form under the control of the processor.

Figure 6:
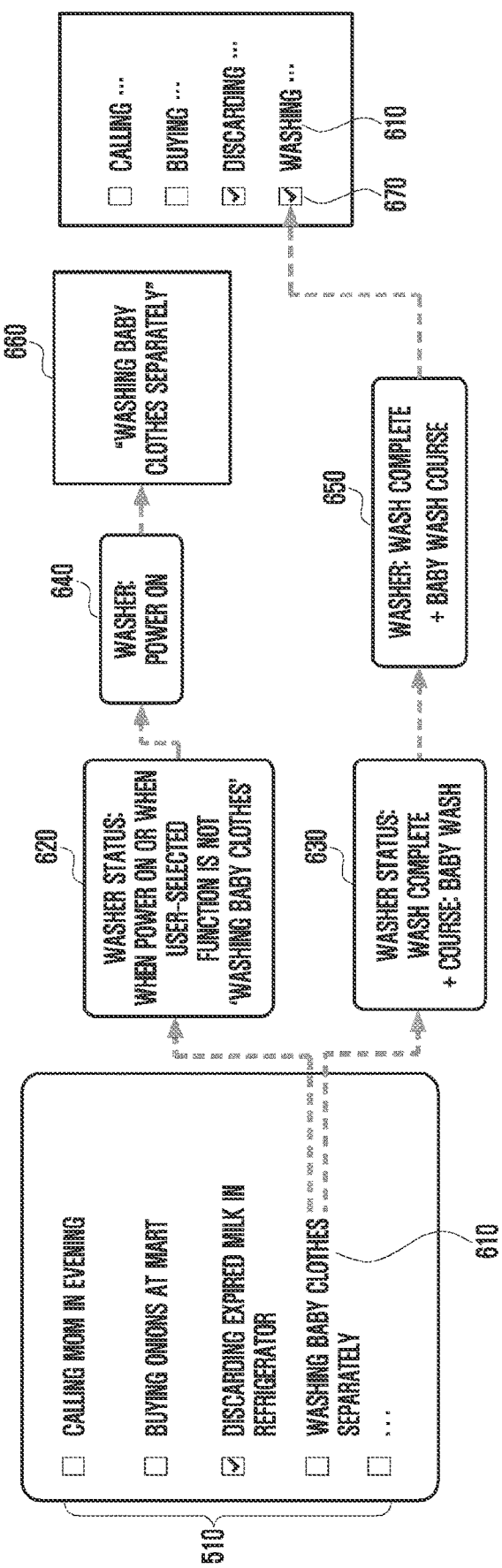
FIG. 6 illustrates operations of managing a washer-related task according to an embodiment.

FIG. 6 illustrates operations of managing a washer-related task according to an embodiment. The operations of FIG. 6 may be performed by a processor of the task management server 240 (e.g., the assistant server 260). Alternatively, the operations of FIG. 6 may be performed by a processor of a user device 401 in the group 210.

The processor may perform a semantic analysis using an AI algorithm on task data indicating "washing baby clothes separately", which is a second incomplete task 601 in the task list 510, and thereby determine a target device as a washer. Then, using the mapping table, the processor may determine a first condition 620 of the washer for triggering a reminder as 'washer status: when power on or when user-selected function is not washing baby clothes'. Using the mapping table, the processor may determine a second condition 630 of the washer for triggering a task completion as 'washer status: wash complete+course: baby wash. The washer may transmit data indicating the status of the washer to the processor by using a wireless communication circuit.

When first data 640 received from the washer corresponds to the first condition 620, the processor may display a reminder message 660 on the display. When second data 650 received from the washer corresponds to the second condition 630, the processor may perform a task completion notification. For example, a box 670 related to the second task 601 may be displayed in a checked form under the control of the processor.

FIG. 7 illustrates operations of generating reminder and task completion conditions by using task data according to an embodiment. The operations of FIG. 7 may be performed by a processor of the task management server 240 (e.g., the assistant server 260). Alternatively, the operations of FIG. 7 may be performed by a processor of a user device 401 in the group 210.

The processor may recognize, from task data 710, 'bedding laundry' as a device-related keyword contained in the keyword list of the mapping table. Also, from the task data 710, the processor may recognize 'this week' as a time-related keyword and recognize 'in' as a time condition-related keyword.

The processor may recognize a washer and a dryer as user devices corresponding to the identified keywords in a device list 720 of the mapping table. Then, the processor may perform an inquiry by referring to the device information DB and thereby determine the washer as a target device. In addition, the processor may identify statuses 731, 732, 733, and 734 corresponding to the washer from a status list 730 of the mapping table. The processor may identify a time condition 741 corresponding to the time condition-related keyword 'in' from a time condition list 740 of the mapping table.

The processor may generate a first condition 750 by using the time condition 741, the first status 731, and the second status 732. For example, the processor may generate a date (and day of the week) corresponding to the end of the week 9/29 (Sun), as a time condition 751 for triggering a reminder. The processor may generate "washer—power on" or "washer—if selected course is not bedding laundry" as a device condition 750 for triggering the reminder.

In addition, the processor may generate a second condition 760 by using the second status 732 and the fourth status 734. For example, the processor may generate "when selected course is bedding laundry and cycle is ended" as a second condition 760 for triggering a task completion.

FIGS. 8A, 8B, 8C, and 8D illustrate user interfaces for supporting a task management according to embodiments. The user interfaces of FIGS. 8A, 8B, 8C, and 8D may be provided by a processor of a user device 401 in the group 210.

Figure 8A:
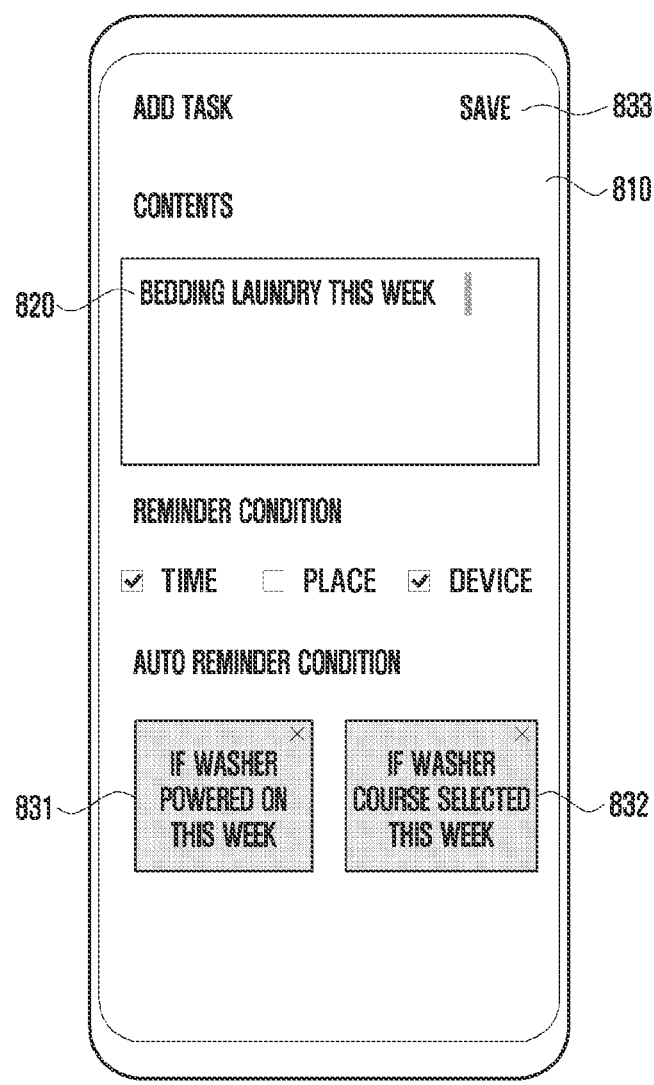
FIGS. 8A, 8B, 8C, and 8D illustrate user interfaces for supporting a task management according to embodiments.

Referring to FIG. 8A, the processor may execute a reminder application and display a task creation screen 810 on a display. The processor may represent inputted task data 820 and a plurality of reminder conditions 831 and 832 automatically generated based on the task data 820 in the task creation screen 810 displayed on the display. The processor may represent in the task creation screen 810 that the reminder conditions 831 and 832 are related to time and device. For example, among boxes corresponding to time, place, and device, the time and device boxes may be checked. The reminder conditions 831 and 832 may be cancelled. For example, an X-shaped cancel button may be contained in the conditions 831 and 832, and the user may touch the cancel button in one 832 of the conditions 831 and 832. Then, the processor may cancel the corresponding reminder condition 832. If the user does not cancel, all of the reminder conditions 831 and 832 may be determined as conditions for triggering a reminder. The processor may represent a save button 833 in the task creation screen 810. Upon receiving a user's touch input on the save button 833, the processor may store the task data 820, a first condition (e.g., the reminder condition 831 is not cancelled), and a second condition (i.e., a task completion condition).

Figure 8B:
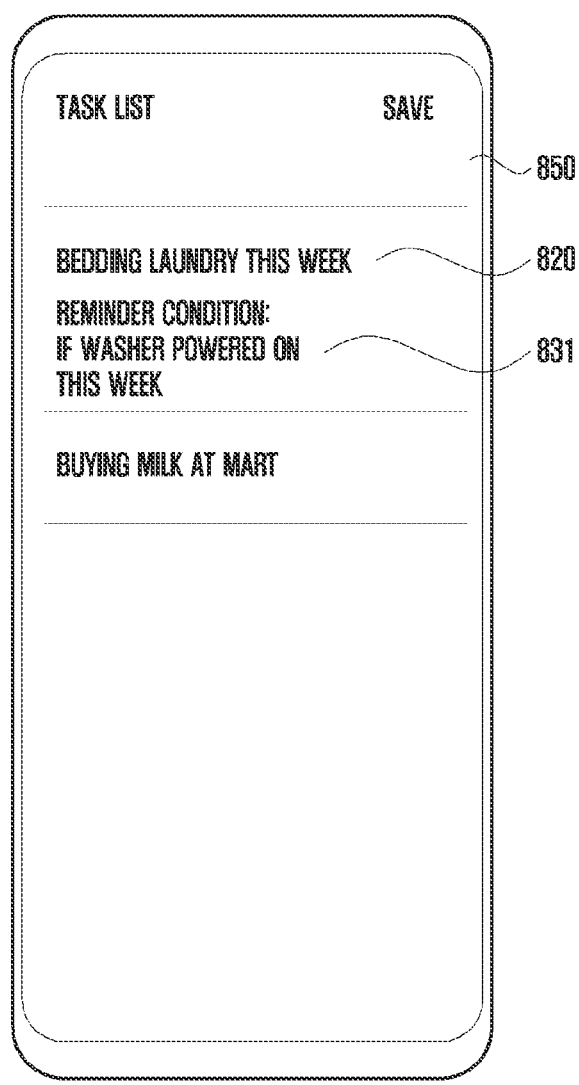

Referring to FIG. 8B, the processor may represent the reminder condition 831 along with corresponding task data 820 in a task list 850.

Figure 8C:
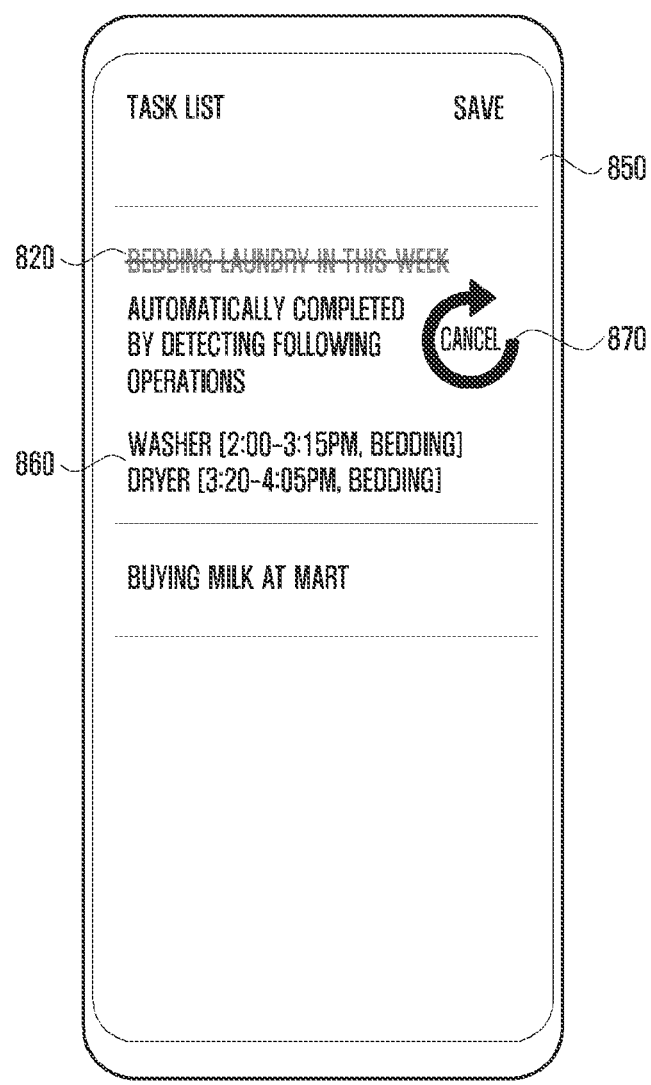

Referring to FIG. 8C, when the task is determined to be completed (e.g., "YES" in step 360 in FIG. 3), the task data 820 may be represented as being completed. For example, "2:00 PM washer operation+bedding course" and "3:15 PM washer end" may be collected as the operation history of the washer, and "3:20 PM dryer start+bedding course" and "4:05 PM dryer end" may be collected as the operation history of the dryer. Based on this operation history, the processor may determine that the corresponding task has been completed. Then, the processor may represent a strikethrough line on the task data 820 to inform the user of the task completion. The processor may represent a reason 860 (or operation history) for determining the task completion and a completion cancel button 870 in the task list 850.

Figure 8D:
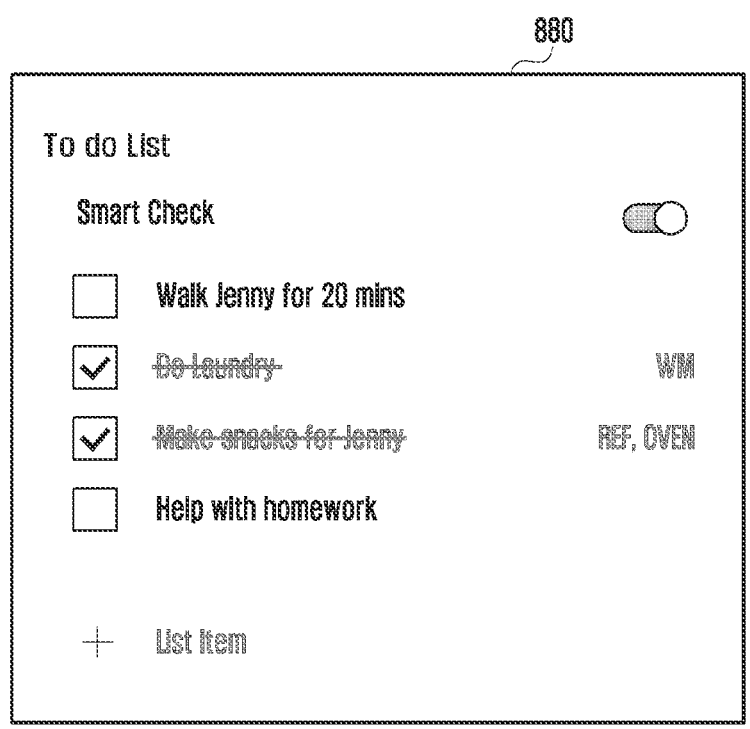

Referring to FIG. 8D, the processor may display, on the display, another task list 880 different from the above-described task list 850. For example, each task in this task list 880 may have a square box. The user can recognize that a checked box indicates a completed task and an unchecked box indicates an incomplete task. When the user touches the checked box, the processor may cancel the completion of the task.

Figure 9A:
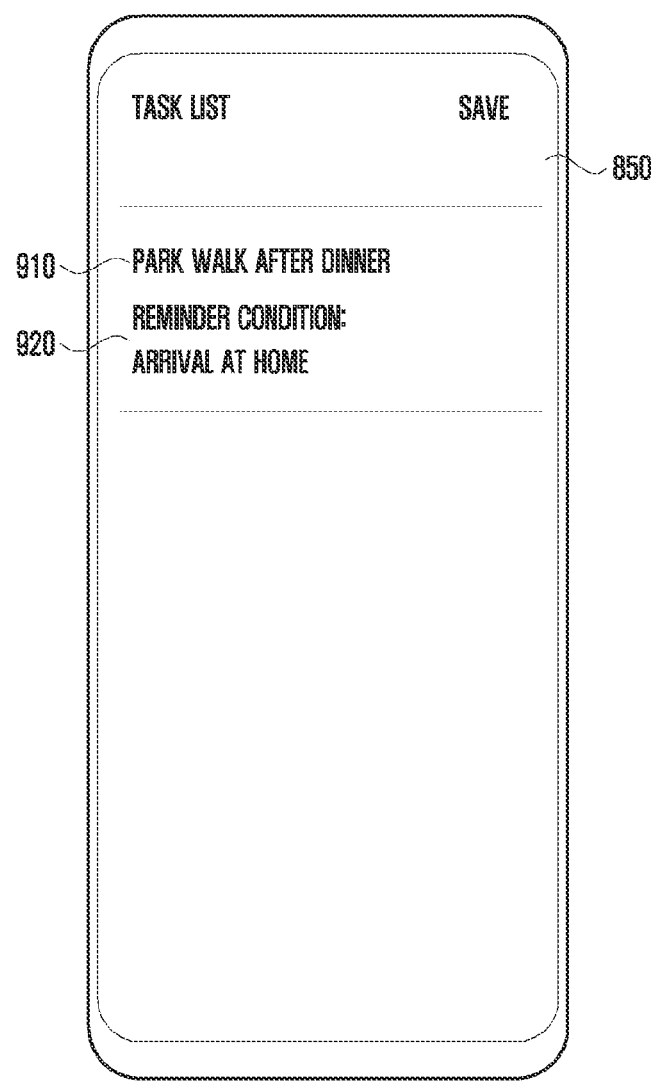
FIGS. 9A and 9B illustrate user interfaces for supporting a task management according to embodiments.
Figure 9B:
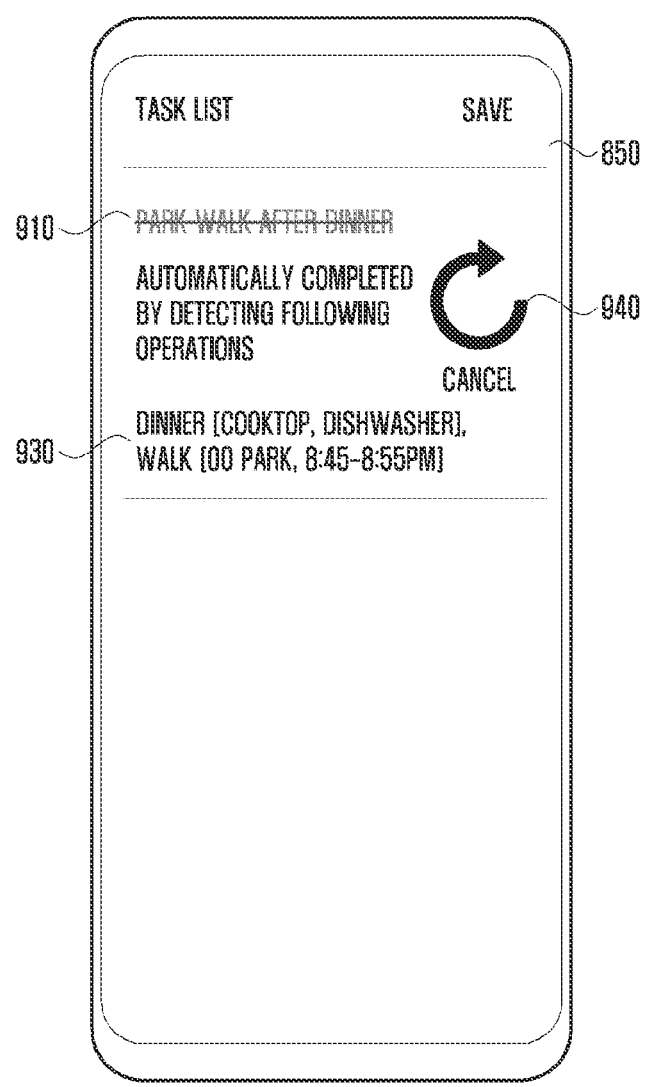

FIGS. 9A and 9B illustrate user interfaces for supporting a task management according to embodiments. The user interfaces of FIGS. 9A and 9B may be provided by a processor of a user device 401 in the group 210.

Referring to FIG. 9A, the processor may represent a newly created second task data 910 and a reminder condition 920 generated based on the second task data 910 in the task list 850.

Referring to FIG. 9B, when the task is determined to be completed (e.g., "YES" in step 360), the second task data 910 may be represented as being completed. For example, "6:00 PM home arrival" may be collected as the operation history of a mobile device or wearable device, and thereby a reminder for the corresponding task may be performed. Then, operation histories "7:00 PM cooktop operation", "8:20 PM dishwasher operation", "8:00 PM leaving home", "8:45 PM arriving at park", "time in park (e.g., minimum stay requirement of 5 minutes or more)", and "8:55 PM leaving park" may be collected. Based on this operation history, the processor may determine that the corresponding task has been completed. Then, the processor may represent a strikethrough line on the second task data 910 to inform the user of the task completion. The processor may represent a reason 930 (or operation history) for determining the task completion and a completion cancel button 940 in the task list 850.

Figure 10A:
FIGS. 10A, 10B, and 10C illustrate user interfaces for supporting a task management based on a voice recognition according to embodiments.
Figure 10B:
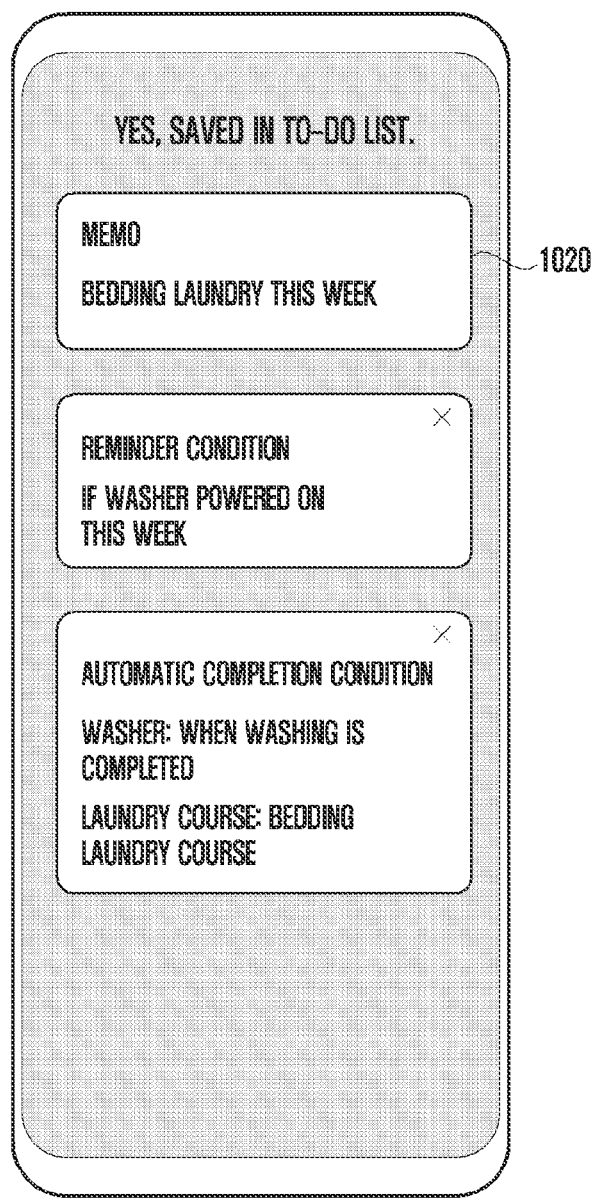
Figure 10C:
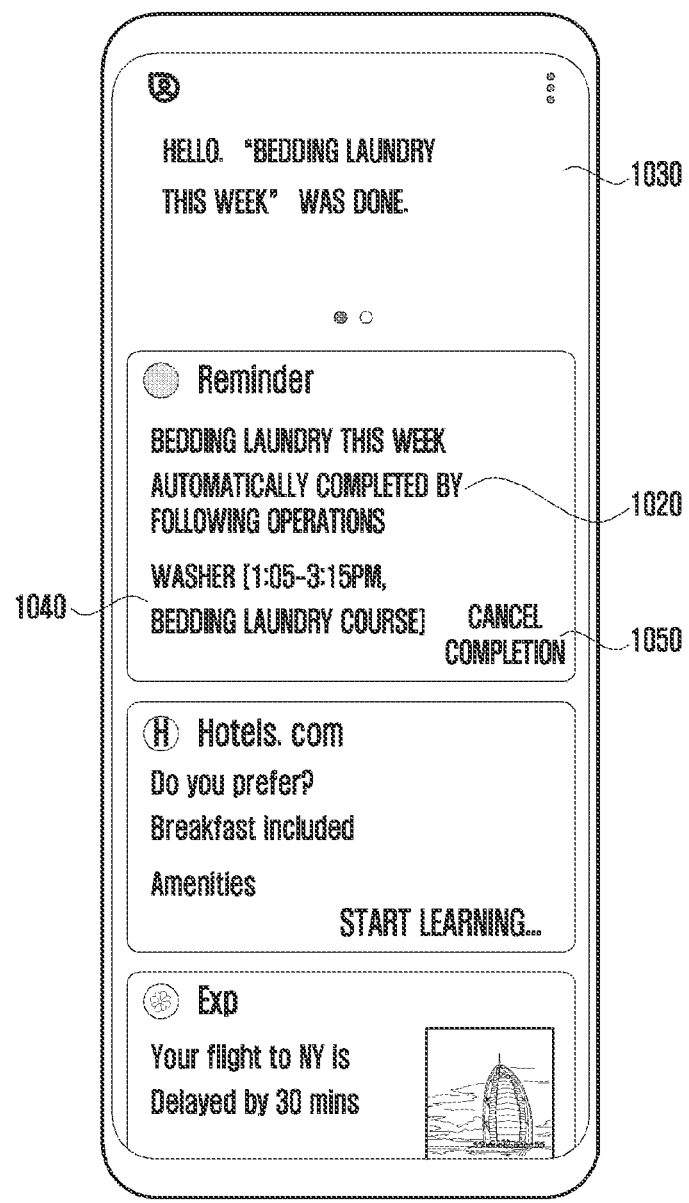

FIGS. 10A, 10B, and 10C illustrate user interfaces for supporting a task management based on a voice recognition according to embodiments. The user interfaces of FIGS. 10A, 10B, and 10C may be provided by a processor of a user device 401 in the group 210.

Referring to FIG. 10A, the user device may support a voice assistant service. For example, the processor of the user device may receive a user's speech 1010 through a microphone provided in the user device or an external electronic device (e.g., an AI speaker registered as a member of the group 210). Then, using an automatic speech recognition (ASR) module, the processor may convert the speech into text data and thereby support a task management service.

Referring to FIG. 10B, the user device may perform a semantic analysis using an AI algorithm for text data and thereby recognize that a user's intention is 'adding a task'. Then, the processor may execute a reminder application and add task data 1020 to a task list.

Referring to FIG. 10C, when the task is determined to be completed (e.g., "YES" in step 360), the task data 1020 may be represented as being completed. For example, "1:05 PM washer operation+bedding course" and "3:15 PM washer end" may be collected as the operation history of the washer. Based on this operation history, the processor may determine that the corresponding task has been completed. Then, the processor may represent a completion notification message 1030, a reason 1040 (or operation history) for determining the task completion, and a completion cancel button 1050 in the task list.

Figure 11A:
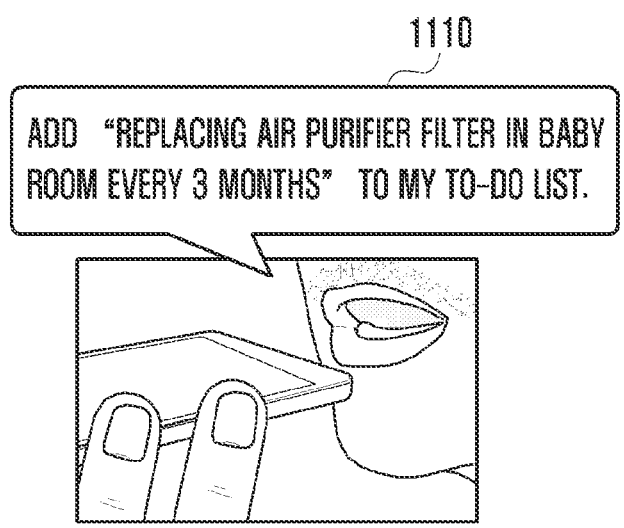
FIGS. 11A, 11B, and 11C illustrate user interfaces for supporting a task management based on a voice recognition according to embodiments.
Figure 11B:
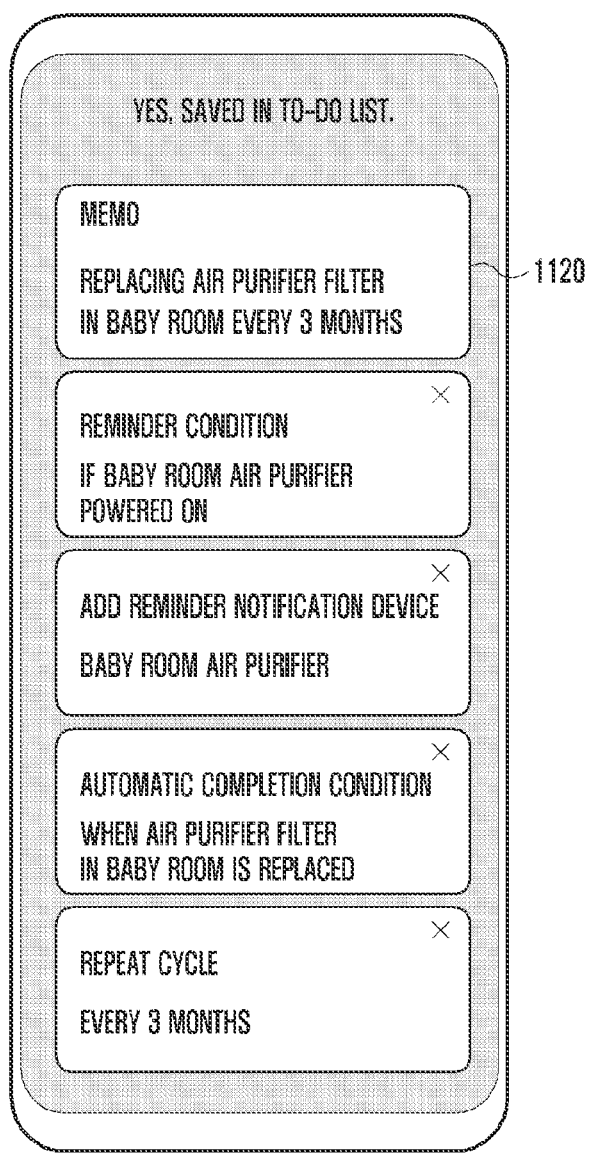
Figure 11C:
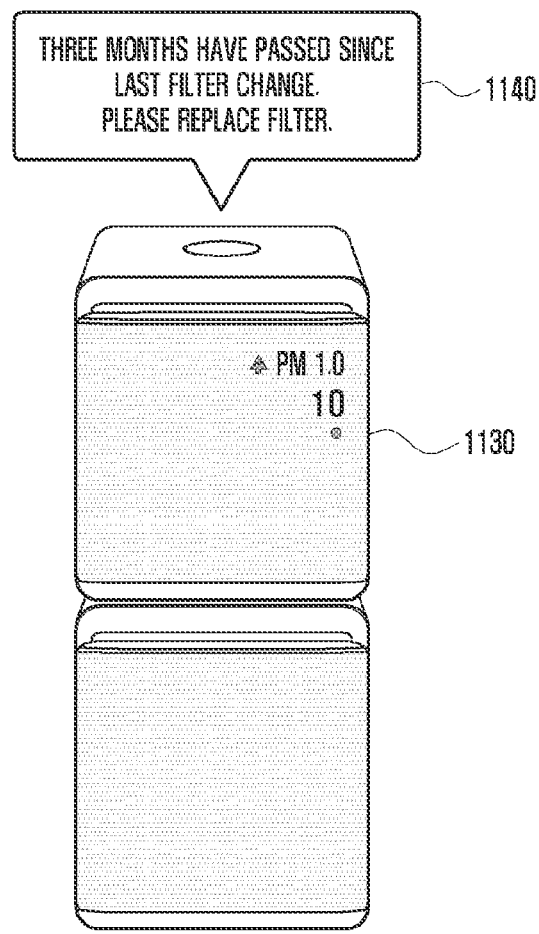

FIGS. 11A, 11B, and 11C illustrate user interfaces for supporting a task management based on a voice recognition according to embodiments. The user interfaces of FIGS. 11A, 11B, and 11C may be provided by a processor of a user device 401 in the group 210.

Referring to FIG. 11A, the processor of the user device may receive a user's speech 1110 through a microphone or an external electronic device. Then, using the ASR module, the processor may convert the speech into text data.

Referring to FIG. 11B, the user device may perform a semantic analysis using an AI algorithm for text data and thereby recognize that a user's intention is 'adding a task'. Then, the processor may execute a reminder application and add task data 1120 to a task list.

Referring to FIG. 11C, when it is determined that an operation history of a target device 1130 (e.g., air purifier) satisfies a reminder condition (e.g., "YES" in step 340), the target device 1130 may output a reminder message 1140.

According to an embodiment, an electronic device may include a communication circuit; a memory configured to store identification information for identifying a plurality of user devices registered in a user device group, and a processor connected to the communication circuit and the memory. The memory may store instructions causing, upon executed, the processor to, by using task data including information indicating a task to be performed, select a target device to be monitored from among the user devices and generate a reminder condition and a task completion condition, to, based on receiving a first operation history satisfying the reminder condition from the target device through the communication circuit, transmit a reminder message for the task to a designated user device among the user devices through the communication circuit, and to, based on receiving a second operation history satisfying the task completion condition from the target device through the communication circuit, transmit a completion message of the task to the designated user device through the communication circuit to terminate monitoring.

The memory may store a mapping table used for generating the reminder condition and the task completion condition. The instructions may cause the processor to recognize a device-related keyword from the task data, to recognize the target device corresponding to the keyword from the mapping table, to recognize a first status triggering a reminder of the task and a second status triggering a completion of the task from a status list of the target device in the mapping table, and to add information indicating the first status to the reminder condition and add information indicating the second status to the task completion condition.

The instructions may cause the processor to, by using the task data, generate the task completion condition containing a time to trigger a completion of the task and a second status of the target device to trigger the completion of the task, and when the second operation history satisfies the second status, to transmit the completion message at the time. The instructions may cause the processor to generate the second status including an operating status of the target device triggering the completion of the task and a place change condition triggering the completion of the task, to receive data used for tracking, using the communication circuit, a location of the designated user device from the designated user device through the communication circuit, and when the second operation history satisfies the operating status and location change information acquired as a result of the tracking satisfies the place change condition, to transmit the completion message at the time.

The instructions may cause the processor to, by using the task data, generate the reminder condition containing a time to trigger a reminder for the task and a first status of the target device to trigger the reminder, and when the first operation history satisfies the first status, to transmit the reminder message at the time. The instructions may cause the processor to, by using the task data, generate the first status including a place change condition triggering the reminder, to receive data used for tracking, using the communication circuit, a location of the designated user device from the designated user device through the communication circuit, and when location change information acquired as a result of the tracking satisfies the place change condition, to transmit the reminder message at the time.

The instructions may cause the processor to, upon receiving a completion cancellation message from the designated user device through the communication circuit, resume the monitoring.

According to an embodiment, an electronic device may include a communication circuit, a memory configured to store identification information for identifying a plurality of user devices registered in a user device group, and a processor connected to the communication circuit and the memory. The memory may store instructions causing, upon executed, the processor to, by using task data including information indicating a task to be performed, select a target device to be monitored from among the user devices and generate a reminder time and a task completion condition, to, at the reminder time, transmit a reminder message for the task to a designated user device among the user devices through the communication circuit, and based on receiving an operation history satisfying the task completion condition from the target device through the communication circuit, to transmit a completion message of the task to the designated user device through the communication circuit to terminate monitoring. The instructions may cause the processor to, by using the task data, generate the task completion condition containing a time to trigger a completion of the task and a status of the target device to trigger the completion of the task, and when the operation history satisfies the status, to transmit the completion message at the time. The instructions may cause the processor to generate the status including an operating status of the target device triggering the completion of the task and a place change condition triggering the completion of the task, to receive data used for tracking, using the communication circuit, a location of the designated user device from the designated user device through the communication circuit, and to, when the operation history satisfies the operating status and when location change information acquired as a result of the tracking satisfies the place change condition, transmit the completion message at the time.

According to an embodiment, a mobile electronic device may include a display, a wireless communication circuit, a memory configured to store identification information for identifying a plurality of user devices registered in a user device group, and a processor connected to the display, the wireless communication circuit, and the memory. The memory may store instructions causing, upon executed, the processor to, by using task data including information indicating a task to be performed, select a target device to be monitored from among the user devices and generate a reminder condition and a task completion condition, to display, based on receiving a first operation history satisfying the reminder condition from the target device through the wireless communication circuit, a reminder message for the task on the display, and based on receiving a second operation history satisfying the task completion condition from the target device through the communication circuit, to display a completion message of the task on the display to terminate monitoring.

The memory may store a mapping table used for generating the reminder condition and the task completion condition. The instructions may cause the processor to recognize a device-related keyword from the task data, to recognize the target device corresponding to the keyword from the mapping table, to recognize a first status triggering a reminder of the task and a second status triggering a completion of the task from a status list of the target device in the mapping table, and to add information indicating the first status to the reminder condition and add information indicating the second status to the task completion condition.

The instructions may cause the processor to, by using the task data, generate the task completion condition containing a time to trigger a completion of the task and a second status of the target device to trigger the completion of the task, and when the second operation history satisfies the second status, to display the completion message at the time. The instructions may cause the processor to generate the second status including an operating status of the target device triggering the completion of the task and a place change condition triggering the completion of the task, to track a location of the mobile user device by using the wireless communication circuit, and when the second operation history satisfies the operating status and when location change information acquired as a result of the tracking satisfies the place change condition, to display the completion message at the time.

The instructions may cause the processor to generate, by using the task data, the reminder condition containing a time to trigger a reminder for the task and a first status of the target device to trigger the reminder, and when the first operation history satisfies the first status, to display the reminder message at the time. The instructions may cause the processor to generate, by using the task data, the first status including a place change condition triggering the reminder, to track a location of the mobile user device by using the wireless communication circuit, and when location change information acquired as a result of the tracking satisfies the place change condition, to display the reminder message at the time.

The instructions may cause the processor to display on the display a first user interface enabling a completion of the task to be cancelled, and when the completion of the task is cancelled through the first user interface, to resume the monitoring.

The instructions may cause the processor to display on the display a second user interface enabling the task completion condition to be edited.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. A task management server comprising:
   a communication circuit;
   a memory; and
   a processor connected to the communication circuit and the memory,
   wherein the memory stores instructions, which when executed, cause the processor to:
   store, in the memory, identification information for identifying a plurality of user devices,
   store, in the memory, a mapping table used to generate a reminder condition and a task completion condition,
   receive task data from a first user device through the communication circuit, the task data including information indicating a task to be performed,
   recognize a device-related keyword from the task data,
   recognize, by using the mapping table, a second user device corresponding to the keyword as a target to be monitored,
   recognize a first status triggering a reminder of the task and a second status triggering a completion of the task from a status list of the second user device in the mapping table,
   add information indicating the first status to the reminder condition,
   add information indicating the second status to the task completion condition,
   based on receiving a first operation history satisfying the reminder condition from the second user device through the communication circuit, transmit a reminder message for the task to the first user device through the communication circuit, and
   based on receiving a second operation history satisfying the task completion condition from the second user device through the communication circuit, transmit a completion message of the task to the first user device through the communication circuit and terminate monitoring of the second user device.

2. The task management server of claim 1, wherein the instructions further cause the processor to:
   generate, by using the task data, the task completion condition containing a time to trigger a completion of the task, and transmit the completion message at the time, when the second operation history satisfies the second status.

3. The task management server of claim 2, wherein the instructions further cause the processor to:
generate the second status including an operating status of the second user device triggering the completion of the task and a place change condition triggering the completion of the task,
receive data used for tracking, using the communication circuit, a location of the first user device from the designated user device through the communication circuit, and
transmit the completion message at the time, when the second operation history satisfies the operating status and location change information acquired as a result of that the tracking satisfies the place change condition.

4. The task management server of claim 1, wherein the instructions further cause the processor to:
generate, by using the task data, the reminder condition containing a time to trigger a reminder for the task, and
transmit the reminder message at the time, when the first operation history satisfies the first status.

5. The task management server of claim 4, wherein the instructions further cause the processor to:
generate, by using the task data, the first status including a place change condition triggering the reminder,
receive data used for tracking, using the communication circuit, a location of the first user device from the designated user device through the communication circuit, and
transmit the reminder message at the time, when location change information acquired as a result of the tracking satisfies the place change condition.

6. The task management server of claim 1, wherein the instructions further cause the processor to:
resume the monitoring of the second user device, upon receiving a completion cancellation message from the first user device through the communication circuit.

7. A mobile electronic device comprising:
a display configured to generate an input signal in response to a touch;
a wireless communication circuit;
a memory; and
a processor connected to the display, the wireless communication circuit, and the memory,
wherein the memory stores instructions, which when executed, cause the processor to:
store, in the memory, identification information for identifying a plurality of user devices,
store, in the memory, a mapping table used to generate a reminder condition and a task completion condition,
display a first user interface on the display to enable a user to create tasks,
receive task data from the first user interface through the display, the task data including information indicating a task to be performed,
recognize a device-related keyword from the task data,
recognize, by using the mapping table, a user device corresponding to the keyword as a target to be monitored,
recognize a first status triggering a reminder of the task and a second status triggering a completion of the task from a status list of the user device in the mapping table,
add information indicating the first status to the reminder condition,
add information indicating the second status to the task completion condition,
based on receiving a first operation history satisfying the reminder condition from the user device through the wireless communication circuit, display a reminder message for the task on the display, and
based on receiving a second operation history satisfying the task completion condition from the user device through the communication circuit, display a completion message of the task on the display to terminate monitoring of the user device.

8. The mobile electronic device of claim 7, wherein the instructions further cause the processor to:
generate, by using the task data, the task completion condition containing a time to trigger a completion of the task, and
display the completion message at the time, when the second operation history satisfies the second status.

9. The mobile electronic device of claim 8, wherein the instructions further cause the processor to:
generate the second status including an operating status of the user device triggering the completion of the task and a place change condition triggering the completion of the task,
track a location of the mobile electronic device by using the wireless communication circuit, and
when the second operation history satisfies the operating status and when location change information acquired as a result of the tracking satisfies the place change condition, display the completion message at the time.

10. The mobile electronic device of claim 7, wherein the instructions further cause the processor to:
generate, by using the task data, the reminder condition containing a time to trigger a reminder for the task, and
display the reminder message at the time, when the first operation history satisfies the first status.

11. The mobile electronic device of claim 10, wherein the instructions further cause the processor to:
generate, by using the task data, the first status including a place change condition triggering the reminder,
track a location of the mobile user device by using the wireless communication circuit, and
display the reminder message at the time, when location change information acquired as a result of the tracking satisfies the place change condition.

12. The mobile electronic device of claim 7, wherein the instructions further cause the processor to:
display on the display a second user interface enabling a completion of the task to be cancelled, and
resume the monitoring of the user device, when the completion of the task is cancelled through the second user interface.

13. The mobile electronic device of claim 7, wherein the instructions further cause the processor to:
display on the display a third user interface enabling the task completion condition to be edited.

14. A method of operating a mobile electronic device, the method being performed by a processor configured in the mobile electronic device, the method comprising:
storing, in a memory of the mobile electronic device, identification information for identifying a plurality of user devices;
storing, in the memory, a mapping table used to generate a reminder condition and a task completion condition;
displaying a first user interface on a touch sensitive display of the mobile electronic device to enable a user to create tasks;

receiving task data from the first user interface through the display, the task data including information indicating a task to be performed;

recognize a device-related keyword from the task data;

recognize, by using the mapping table, a user device corresponding to the keyword as a target to be monitored;

recognize a first status triggering a reminder of the task and a second status triggering a completion of the task from a status list of the user device in the mapping table;

add information indicating the first status to the reminder condition;

add information indicating the second status to the task completion condition;

based on receiving a first operation history satisfying the reminder condition from the user device through a communication circuit of the mobile electronic device, displaying a reminder message of the task on the display; and based on receiving a second operation history satisfying the task completion condition from the user device through the communication circuit, displaying a completion message of the task on the display to terminate monitoring of the user device.

* * * * *